United States Patent
Moon

(10) Patent No.: US 10,409,383 B2
(45) Date of Patent: Sep. 10, 2019

(54) WEARABLE DEVICE AND METHOD OF TRANSMITTING CONTENT

(71) Applicant: SAMSUNG ELECTRONICS CO., LTD., Suwon-si, Gyeonggi-do (KR)

(72) Inventor: Jae-min Moon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 64 days.

(21) Appl. No.: 14/882,595

(22) Filed: Oct. 14, 2015

(65) Prior Publication Data
US 2016/0109958 A1 Apr. 21, 2016

(30) Foreign Application Priority Data
Oct. 21, 2014 (KR) .................. 10-2014-0142779

(51) Int. Cl.
| | |
|---|---|
| G06F 3/01 | (2006.01) |
| H04B 1/3827 | (2015.01) |
| G06F 1/16 | (2006.01) |
| H04W 76/14 | (2018.01) |
| H04W 4/80 | (2018.01) |
| H04W 8/00 | (2009.01) |

(52) U.S. Cl.
CPC .............. *G06F 3/017* (2013.01); *G06F 1/163* (2013.01); *G06F 1/1694* (2013.01); *H04B 1/385* (2013.01); *H04W 4/80* (2018.02); *H04W 76/14* (2018.02); *H04W 8/005* (2013.01)

(58) Field of Classification Search
CPC ... H04W 4/008; H04W 76/023; H04W 8/005; H04W 4/80; H04W 76/14; H04M 1/7253; G06F 3/017; G06F 1/163; H04B 1/385

USPC .......................................... 345/156; 455/418
See application file for complete search history.

(56) References Cited

U.S. PATENT DOCUMENTS

| | | | |
|---|---|---|---|
| 8,347,366 | B2 | 1/2013 | Lee |
| 8,725,842 | B1 | 5/2014 | Al-Nasser |
| 2008/0195735 | A1 | 8/2008 | Hodges et al. |
| 2011/0018731 | A1 | 1/2011 | Linsky et al. |
| 2012/0306643 | A1* | 12/2012 | Dugan ............ A61B 5/02 340/539.12 |
| 2013/0232095 | A1 | 9/2013 | Tan et al. |
| 2013/0262298 | A1 | 10/2013 | Morley |
| 2014/0049417 | A1 | 2/2014 | Abdurrahman et al. |

(Continued)

FOREIGN PATENT DOCUMENTS

| | | |
|---|---|---|
| EP | 2 779 605 A1 | 9/2014 |
| JP | 2008-154004 | 7/2008 |
| KR | 10-1354252 | 1/2014 |

OTHER PUBLICATIONS

Search Report and Written Opinion dated Jan. 25, 2016 in counterpart International Patent Application No. PCT/KR2015/010839.

(Continued)

*Primary Examiner* — Nitin Patel
*Assistant Examiner* — Amy Onyekaba
(74) *Attorney, Agent, or Firm* — Nixon & Vanderhye P.C.

(57) ABSTRACT

A wearable device includes a communication unit configured to communicate with a host device, a sensing unit configured to recognize at least one motion, and a control unit configured to control the host device to transmit to an external device first content mapped to a first motion recognized by the sensing unit.

12 Claims, 25 Drawing Sheets

(56) References Cited

U.S. PATENT DOCUMENTS

| | | | |
|---|---|---|---|
| 2014/0273849 A1* | 9/2014 | Lee | G06F 3/017 |
| | | | 455/41.2 |
| 2015/0011199 A1* | 1/2015 | Lee | H04M 1/7253 |
| | | | 455/418 |
| 2015/0031348 A1* | 1/2015 | Lee | H04B 1/385 |
| | | | 455/418 |
| 2016/0006850 A1* | 1/2016 | Ohki | H04M 1/7253 |
| | | | 455/557 |

OTHER PUBLICATIONS

EP Search Report dated Sep. 4, 2017 for EP Application No. 15852531.1.

* cited by examiner

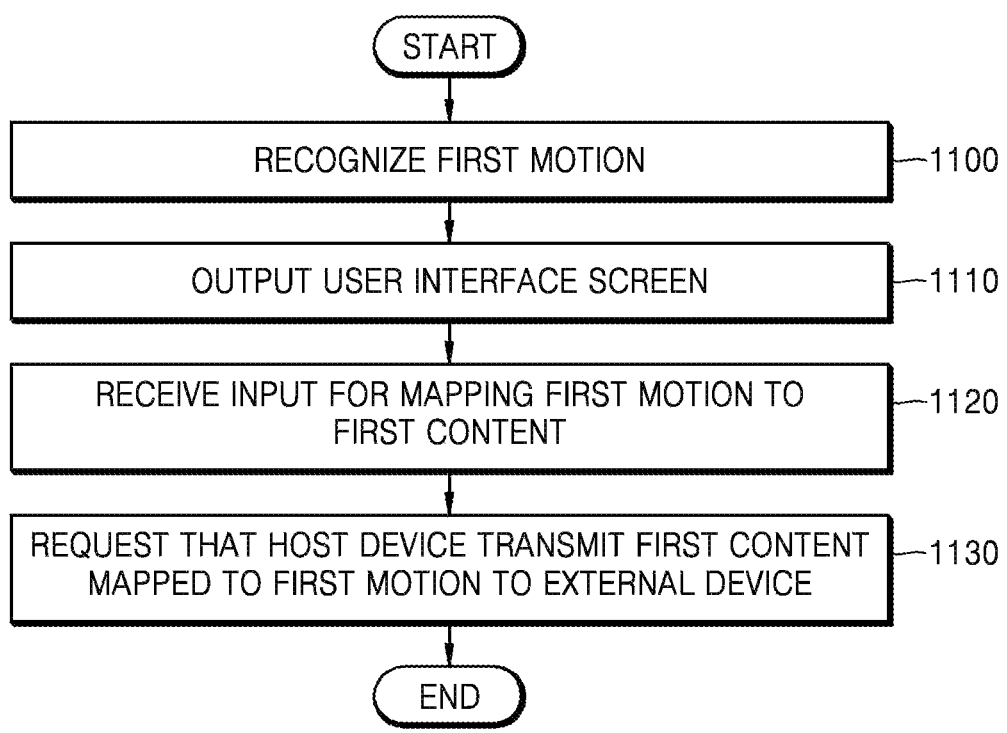

WEARABLE DEVICE AND METHOD OF TRANSMITTING CONTENT

CROSS-REFERENCE TO RELATED APPLICATION

This application is based on and claims priority under 35 U.S.C. § 119 to Korean Patent Application No. 10-2014-0142779, filed on Oct. 21, 2014, in the Korean Intellectual Property Office, the disclosure of which is incorporated by reference herein in its entirety.

BACKGROUND

1. Field

The disclosure relates to a wearable device and a method of transmitting content using the wearable device.

2. Description of Related Art

A wearable device is a device that may be attached to a user's body and may perform a computing operation. For example, the wearable device may be implemented in various forms, such as a watch, glasses, a bracelet, a ring, a necklace, shoes, or a sticker, which can be attached to a user's body.

SUMMARY

A wearable device configured to recognize a user's motion and transmit content to an external device directly or indirectly is provided.

A method of transmitting content to an external device via a wearable device that recognizes a user's motion is provided.

Additional aspects will be set forth in part in the description which follows and, in part, will be apparent from the description.

According to an aspect of an example, a wearable device includes: a communication unit or communication circuitry configured to communicate with a host device; a sensing unit or sensor configured to recognize at least one motion; and a control unit or controller configured to request transmission by the host device of first content mapped to a first motion recognized by the sensing unit to an external device.

In the above-described example device, the control unit may be configured to determine a distance between the wearable device and an external wearable device, and request the host device to transmit the first content to a host device of the external wearable device when the determined distance is equal to or less than a predetermined distance and the sensing unit recognizes the first motion.

The above-described example device may further include: an output unit configured to output a user interface screen; and an input unit configured to receive an input for mapping each of the at least one motion to content.

In the above-described example device, the input unit may receive an input for mapping the first motion to the first content after the sensing unit recognizes the first motion.

In the above-described example device, the control unit may be configured to set a new motion other than the at least one motion based on a motion recognized by the sensing unit or edit the at least one motion.

In the above-described example device, when the sensing unit recognizes the first motion, the control unit may be configured to request the first content mapped to the first motion from the host device, and the communication unit may be configured to receive the first content from the host device and transmit the received first content to the external device In the above-described example device, when the sensing unit recognizes a second motion, the output unit may output a transmission state of the first content.

In the above-described example device, when the sensing unit recognizes a third motion, the control unit may be configured to request the host device to pair with the external device.

In the above-described example device, when the sensing unit recognizes the third motion, the control unit may be configured to request the host device to transmit a Bluetooth broadcasting message including information about pairing with the external device to the external device.

In the above-described example device, the communication unit may be configured to receive at least one signal among a near field communication (NFC) tag signal, an ultrasonic signal, an infrared signal, and a body area network (BAN) signal from the external device, and the control unit may be configured to request that the host device transmit predetermined content mapped to the at least one signal received by the communication unit to the external device based on the at least one signal According to an aspect of another example, a method of transmitting content includes: recognizing, by a wearable device, a first motion; and, when the first motion is recognized, requesting, by the wearable device, a host device to transmit first content mapped to the first motion to an external device.

The above-described example method may further include determining a distance between the wearable device and an external wearable device, and the requesting may include requesting, by the wearable device, the host device to transmit the first content to a host device of the external wearable device when the determined distance is equal to or less than a predetermined distance and the first motion is recognized The above-described example method may further include: displaying a user interface screen on the wearable device; and receiving an input for mapping each of at least one motion to content.

In the above-described example method, receiving an input may include receiving an input for mapping the first motion to the first content after the first motion is recognized.

The above-described example method may further include adding a new motion other than the at least one motion based on a motion recognized by the wearable device and/or editing the at least one motion.

In the above-described example method, requesting may include requesting the first content mapped to the first motion from the host device when the first motion is recognized, and the above-described example method may further include: receiving the first content from the host device; and transmitting the received first content to the external device.

The above-described example method may further include: recognizing, by the wearable device, a second motion; and outputting a transmission state of the first content when the second motion is recognized.

The above-described example method may further include: recognizing, by the wearable device, a third motion; and requesting, by the wearable device, the host device to pair with the external device when the third motion is recognized.

In the above-described example method, requesting may include requesting, by the wearable device, the host device to transmit a Bluetooth broadcasting message including information about the pairing to the external device when the third motion is recognized.

According to an aspect of another example, a non-transitory computer-readable recording medium stores a program for causing a computer to perform the above-described method.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein:

FIG. 11 is a flowchart illustrating another example in which a wearable device requests that a host device transmit content to an external device;

DETAILED DESCRIPTION

Figure 1:
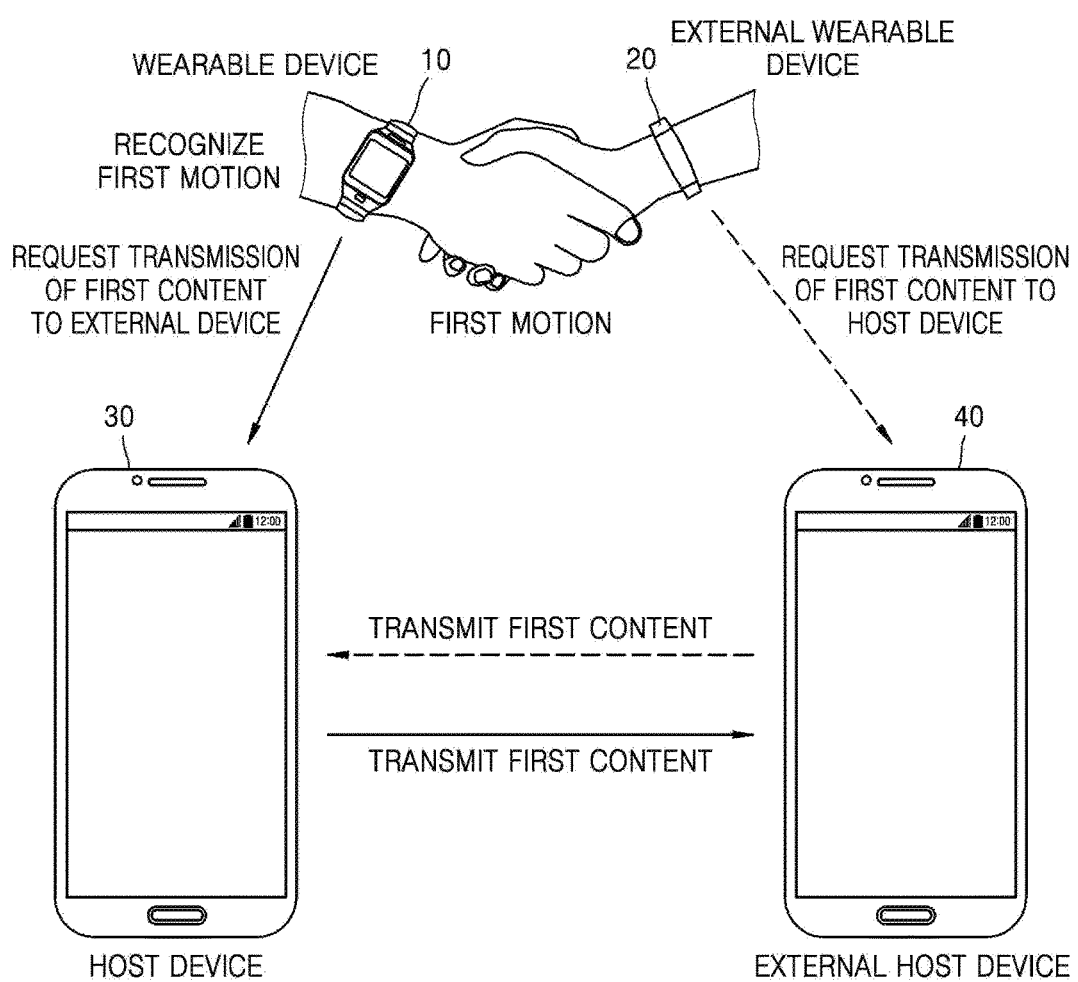
FIG. 1 is a concept diagram illustrating an example in which a wearable device requests that a host device transmit content to an external device.

Reference will now be made in detail to example embodiments, examples of which are illustrated in the accompanying drawings, wherein like reference numerals refer to like elements throughout. In this regard, the examples may have different forms and should not be construed as being limited to the descriptions set forth herein. Accordingly, the examples are described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

Throughout this disclosure, when an element is referred to as being "connected" to another element, it may indicate that the element is "directly connected" to the other element, or the element and the other element are "electrically connected" having one or more elements between them. Also, when an element is referred to as "including" a component, unless specified otherwise, it does not mean that the element excludes any other component, but rather means that the element may further include other components.

Throughout this disclosure, when data is referred to as being "output on the screen of a device," it means that the data is displayed on the screen of the device. Therefore, data referred to as being "output on the screen of a device" is also "displayed on the screen of the device."

Hereinafter, some examples will be described in detail with reference to the accompanying drawings.

FIG. 1 is a concept diagram illustrating an example in which a wearable device requests that a host device transmit content to an external device.

In FIG. 1, a wearable device 10, a host device 30 of the wearable device 10, an external wearable device 20, and a host device 40 of the external wearable device 20 are shown. The host device 40 will be referred to as an external host device 40 below.

The "wearable device 10" is a device that may be attached to a user's body and perform a computing operation. For example, the wearable device 10 may be implemented in various forms, such as a watch, glasses, a bracelet, a ring, a necklace, shoes, or a sticker, which are attachable to the user's body.

Also, the "host device 30" is a device that may be configured to control the wearable device 10. A predetermined application for controlling the wearable device 10 may be installed on the host device 30. In addition, a predetermined widget corresponding to the predetermined application installed in the host device 30 may be installed in the wearable device 10. The host device 30 may execute the predetermined application to transmit predetermined data to the wearable device 10, to receive predetermined data from the wearable device 10, or to command the wearable device 10 to perform a predetermined operation. For example, the host device 30 may control the wearable device 10 to output a notification signal.

The wearable device 10 may control the host device 30 (누락 추가). In the wearable device 10, a predetermined widget for controlling the host device 30 may be installed. In addition, a predetermined application corresponding to the predetermined widget installed in the wearable device 10 may be installed in the host device 30. The wearable device 10 may execute the predetermined widget to transmit predetermined data to the host device 30, to receive predetermined data from the host device 30, or to command the host device 30 to perform a predetermined operation. For example, the wearable device 10 may request current time information from the host device 30.

For example, the host device 30 may be implemented in various forms such as a smart phone, a tablet, or a computer. In general, the wearable device 10 and the host device 30 are used by the same person.

The wearable device 10 communicates with the host device 30. For example, the wearable device 10 is paired with the host device 30 to transmit data to the host device 30 or to receive data from the host device 30. The wearable device 10 may, for example, go through an authentication and registration process so as to pair with the host device 30.

The wearable device 10 may communicate with the host device 30 using a wired or wireless communication method. For example, the wearable device 10 may communicate with the host device 30 through a data cable connected to the host device 30. Also, the wearable device 10 may communicate with the host device 30 using a wireless communication method such as near field communication (NFC), ZIGBEE, Bluetooth, or ultra wideband (UWB) communication, etc.

Also, the wearable device 10 may communicate with the host device 30 through an external server. For example, the wearable device 10 may transmit data to the host device 30 or receive data from the host device 30 through a server using a third generation (3G) or fourth generation (4G) communication network or a wireless fidelity (Wi-Fi) network, etc.

A method for the wearable device 10 to communicate with the host device 30 is not limited thereto. For example, the wearable device 10 may communicate with the host device 30 by using ultrasonic waves, infrared rays, or a body area network (BAN).

The wearable device 10 is configured to recognize at least one motion. The wearable device 10 may recognize various types of motions through a plurality of sensors included in sensing units 2320 and 2420 illustrated in FIGS. 23 and 24, respectively.

A "motion" may include an act of the user moving the wearable device 10 so as to control at least one of the wearable device 10 and the host device 30. For example, a "motion" may, for example, include acts of displacing, rotating, shaking, tilting, and allocating the wearable device 10 in a predetermined direction.

Also, a "motion" may include an act of the user of the wearable device 10 interacting with a user of an external device (which may be the external wearable device 20 or the external host device 40) and moving the wearable device 10. For example, a "motion" may include a motion of the user of the wearable device 10, such as, shaking hands with a user of the external wearable device 20, doing a high-five with the user of the external wearable device 20, putting his or her arm around the shoulders of the user of the external wearable device 20, and pinky swearing with the user of the external wearable device 20, etc.

The wearable device 10 may determine the distance from the external device 20 or 40, and recognize an interactive motion with the external device 20 or 40 based on the determined distance and the recognized motion. When the distance from the external wearable device 20 is equal to or less than a predetermined value and a predetermined motion is recognized, the wearable device 10 may recognize that the user interacts with the user of the external wearable device 20. A method for the wearable device 10 to recognize a motion will be described in detail below with reference to FIG. 4.

When a first motion is recognized, the wearable device 10 may request that the host device 30 transmit first content mapped to the first motion to the external device 20 or 40.

For example, it is assumed that the wearable device 10 does not have enough memory to store the first content, or the first content is stored in the host device 30. In this case, the wearable device 10 may control the host device 30, so that the host device 30 may transmit the first content to the external device 20 or 40.

In another example, it is assumed that the wearable device 10 is not paired with the external device 20 or 40, and only the host device 30 is paired with the external device 20 or 40. When the wearable device 10 cannot directly transmit the first content stored in the wearable device 10 to the external device 20 or 40, the wearable device 10 transmits the first content to the host device 30. Then, the host device 30 transmits the first content received from the wearable device 10 to the external device 20 or 40.

When the wearable device 10 recognizes the first motion, the host device 30 may receive the first content of the external device 20 or 40 mapped to the first motion from the external device 20 or 40. For example, when the external wearable device 20 recognizes the first motion, the external wearable device 20 may request the external host device 40 to transmit the first content of the external host device 40 mapped to the first motion to the host device 30. Also, when the wearable device 10 recognizes the first motion, the wearable device 10 may request the host device 30 to receive the first content of the external host device 40 mapped to the first motion from the external host device 40. Then, the host device 30 may receive the first content of the external host device 40 mapped to the first motion from the external host device 40.

Here, "content" may include a target that may be stored in the external device 20 or 40 and executed by the external device 20 or 40.

As an example, content may include at least one of contact information and business card information. Content may include a target on which a process is performed by at least one of a business card program and a contact information program of the external device 20 or 40. For example, the process may include reading, editing, addition, deletion, and so on.

As another example, content may include bio-information of the user of the wearable device 10 measured by the wearable device 10. Content may include a target on which a process may be performed through a bio-information analysis program of the external device 20 or 40. When the wearable device 10 is a smart watch, content may include pulse information, temperature information, etc. of the user.

As still another example, content may include a target on which a process is performed by a word processing program, Microsoft Excel, Microsoft PowerPoint, etc. installed in the external device 20 or 40.

As yet another example, content may include a photograph, an image, a moving image, music, and so on. Content may include a target on which a process is performed by a photograph execution program, an image execution program, a video execution program, a music execution program, etc. installed in the external device 20 or 40.

In addition, content may include at least one of time information and location information corresponding to the time at which the sensing units 2320 and 2420 of the wearable device 10 recognize the first motion or the host device 30 transmits the first content to the external device 20 or 40.

The "first content" may include content mapped to the first motion. The first content may be predetermined content to be transmitted to the external device 20 or 40 when the wearable device 10 recognizes the first motion.

Therefore, "mapping" may include setting a correspondence between a predetermined motion recognized by the wearable device 10 and predetermined content to be transmitted to the external device 20 or 40. A mapping relationship between a motion and content may be set by the user in the wearable device 10, and updated based on predetermined information that is received by the wearable device 10 from the outside of the wearable device 10. A method of setting a mapping relationship between a motion and content will be described in detail below with reference to FIGS. 5 to 6.

Figure 2:
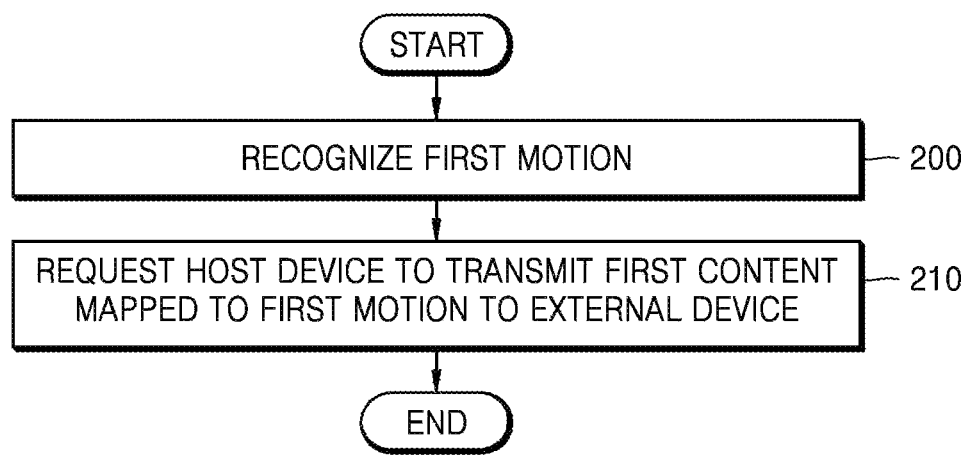
FIG. 2 is a flowchart illustrating an example in which a wearable device requests that a host device transmit content to an external device.

FIG. 2 is a flowchart illustrating an example in which the wearable device 10 requests that the host device 30 transmit content to the external device 20 or 40.

The example illustrated in FIG. 2 includes operations shown and described above with reference to FIG. 1 and processed in order of time by the wearable device 10. Therefore, although omitted below, the above description of an operation of the wearable device 10 shown in FIG. 1 may also be applied to the example illustrated in FIG. 2.

In operation 200, the wearable device 10 recognizes a first motion. For example, the wearable device 10 may recognize a handshake motion. The sensing units 2320 and 2420 (FIGS. 23 and 24) of the wearable device 10 may measure an angle and a speed of the wearable device 10 based on at least one of an acceleration sensor 2422 and a gyro sensor 2425, so that a handshake motion may be recognized. The wearable device 10 may recognize a movement of the wearable device 10 reciprocating a predetermined number of times within a predetermined angular range and a predetermined speed range as a handshake motion. In addition, the wearable device 10 may recognize a high-five motion, a motion of putting an arm around another's shoulder, a pinky swear motion, a hug motion, etc. through various sensors included in the sensing units 2320 and 2420.

In operation 210, when the first motion is recognized, the wearable device 10 requests that the host device 30 transmit first content mapped to the first motion to the external device 20 or 40. Then, the host device 30 transmits the first content to the external device 20 or 40. For example, when a handshake motion is recognized, the wearable device 10 may request that the host device 30 transmit business card information to the external device 20 or 40.

When the first motion is recognized, the wearable device 10 may transmit information associated with the recognized first motion to the host device 30. Then, the host device 30 may search for the first content mapped to the first motion and transmit the searched first content to the external device 20 or 40.

Alternatively, when the first motion is recognized, the wearable device 10 may transmit information on the first content mapped to the first motion to the host device 30. Then, the host device 30 may transmit the first content to the external device 20 or 40 based on the received information on the first content.

Alternatively, when the first motion is recognized, the wearable device 10 may transmit the first content itself mapped to the first motion to the host device 30. For example, if the first content is bio-information measured by the wearable device 10, the wearable device 10 may transmit the bio-information to the host device 30 when the first motion is recognized. Then, the host device 30 may transmit the bio-information which is the received first content to the external device 20 or 40.

Figure 3:
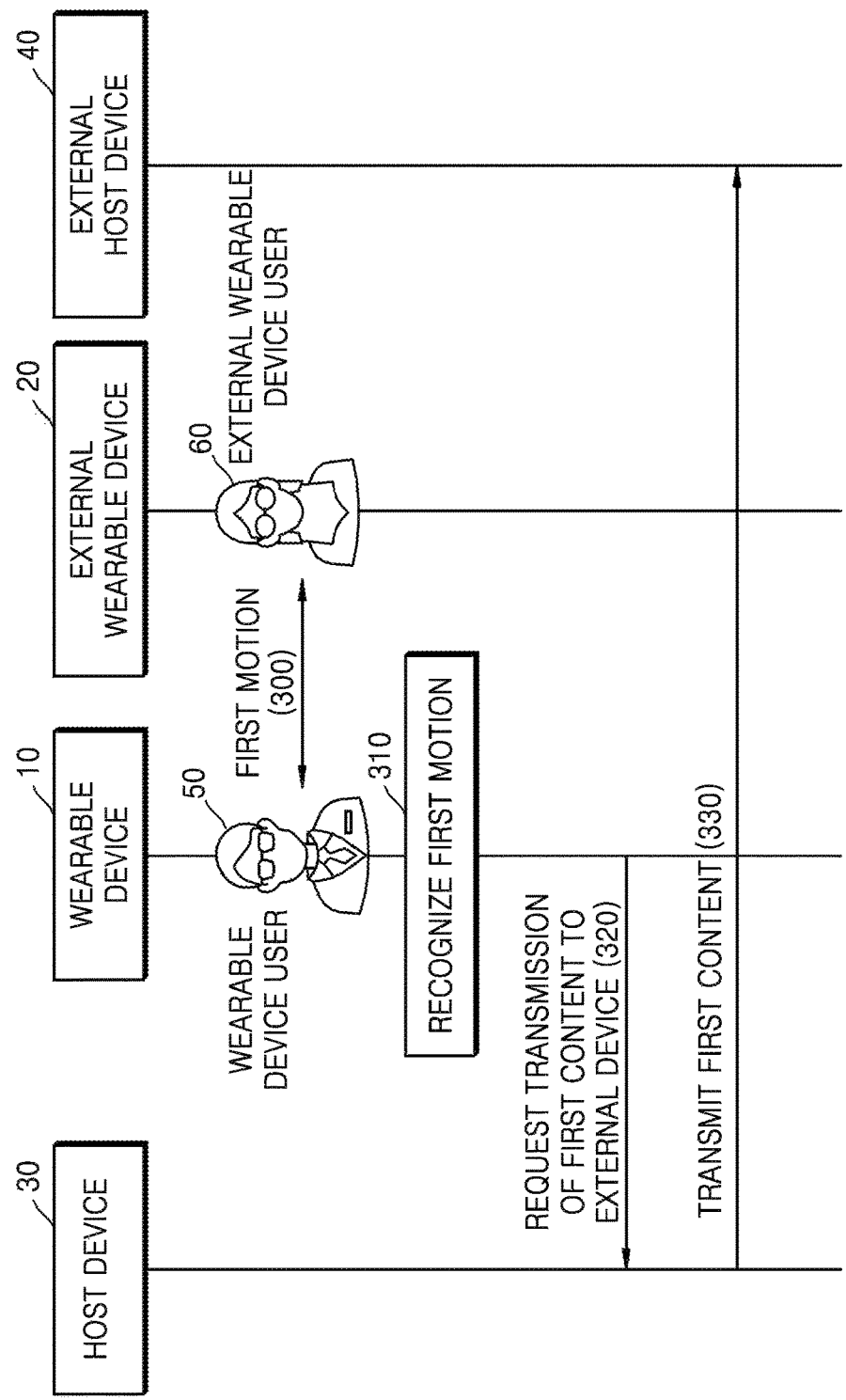
FIG. 3 is a flowchart illustrating an example in which a wearable device requests that a host device transmit content to an external device and the host device transmits the content to the external device.

FIG. 3 is a flowchart illustrating an example in which the wearable device 10 requests that the host device 30 transmit content to the external device 20 or 40 and the host device 30 transmits the content to the external device 20 or 40.

The example illustrated in FIG. 3 includes operations shown and described above with reference to FIG. 1 and processed in order of time by the wearable device 10, the host device 30, the external wearable device 20, and the external host device 40. Therefore, although omitted below, the above description of an operation of the wearable device 10, the host device 30, the external wearable device 20, and the external host device 40 shown in FIG. 1 may also be applied to the example illustrated in FIG. 3.

In operation 300, a user 50 of the wearable device 10 interacts with a user 60 of the external wearable device 20 to perform a first motion. Then, in operation 310, the wearable device 10 may recognize the first motion.

For example, the wearable device 10 and the external wearable device 20 correspond to smart watches, and the user 50 of the wearable device 10 and the user 60 of the external wearable device 20 shake hands with each other (operation 300). Then, the wearable device 10 may recognize a handshake motion (operation 310).

In operation 320, because the first motion has been recognized, the wearable device 10 may request that the host device 30 transmit first content mapped to the first motion to the external device 20 or 40. For example, the wearable device 10 may recognize a handshake motion and request that the host device 30 transmit business card information of the user 50 of the wearable device 10 to the external host device 40. Operation 320 will be described in further detail below with reference to FIG. 7.

In operation 330, the host device 30 may transmit the first content to the external device 20 or 40. For example, the host device 30 may transmit the business card information of the user 50 of the wearable device 10 to the host device 40. In operation 330, it has been described that the host device 30 transmits the first content to the external host device 40, but the host device 30 may transmit the first content to the external wearable device 20. Operation 330 will be described in further detail below with reference to FIG. 8.

Figure 4:
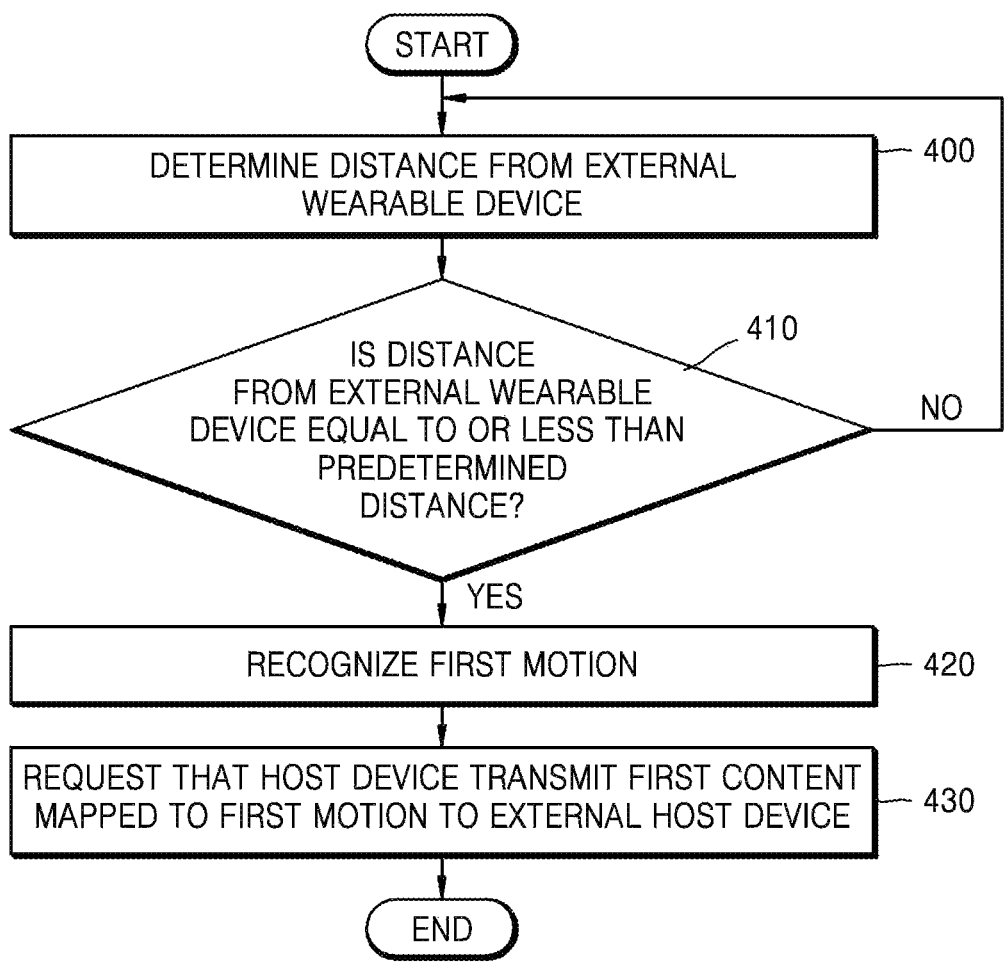
FIG. 4 is a flowchart illustrating another example in which a wearable device requests that a host device transmit content to an external device.

FIG. 4 is a flowchart illustrating another example in which the wearable device 10 requests that the host device 30 transmit content to the external device 20 or 40.

The example illustrated in FIG. 4 includes operations shown and described above with reference to FIG. 1 and processed in order of time by the wearable device 10. Therefore, although omitted below, the above description of an operation of the wearable device 10 shown in FIG. 1 may also be applied to the example illustrated in FIG. 4. Also, operation 420 and operation 430 may correspond to operation 200 and operation 210 of FIG. 2, respectively. Therefore, the same description as that of FIG. 2 will be omitted.

In operation 400, the wearable device 10 may determine the distance from the external wearable device 20. In operation 410, the wearable device 10 determines whether the determined distance from the external wearable device 20 is equal to or less than a predetermined distance.

As described above, a "motion" may include an act of the user of the wearable device 10 interacting with the user of the external device 20 or 40 and moving the wearable device 10. In general, when users perform an interactive motion with each other, the wearable device 10 the external device 20 or 40 may be positioned close to each other.

For example, when the wearable device 10 and the external wearable device 20 are smart watches and the users shake hands, the wearable device 10 and the external wearable device 20 may be positioned adjacent to each other. Therefore, distance information between the wearable device 10 and the external wearable device 20 may be a reference for transmitting first content together with whether or not a first motion is recognized.

Based on a communication signal strength or a receiving sensitivity of the external wearable device 20 measured by the wearable device 10, the wearable device 10 may determine the distance from the external wearable device 20. For example, the wearable device 10 may determine the distance from the external wearable device 20 based on the strength of a Bluetooth signal of the external wearable device 20.

In operation 420, the wearable device 10 may recognize the first motion when the determined distance is equal to or less than the predetermined distance. For example, when the determined distance is equal to or less than the predetermined distance, the wearable device 10 may determine that the user of the wearable device 10 performs an interactive motion with the user of the external wearable device 20.

In operation 430, when the determined distance is equal to or less than the predetermined distance and the first motion is recognized, the wearable device 10 may request that the host device 30 transmit the first content to the external host device 40.

On the other hand, when the determined distance is greater than the predetermined distance, the wearable device 10 may not recognize the first motion. If the determined distance is greater than the predetermined distance, even when the user of the wearable device 10 performs the first motion, the wearable device 10 may not recognize the first motion. Therefore, the first content may not be transmitted to the external host device 40.

In FIG. 4, it has been described that the wearable device 10 determines the distance from the external wearable device 20 (operation 400) before recognizing the first motion (operation 420), but the wearable device 10 may determine the distance from the external wearable device 20 (operation 400) after recognizing the first motion (operation 420). Also, the wearable device 10 may simultaneously perform operation 400 and operation 420.

In addition to the measured distance, the wearable device 10 may set additional references for transmitting the first content. Together with whether or not the first motion is recognized, a temperature, a humidity, an electromagnetic field, a location, an atmospheric pressure, red green and blue (RGB), etc. measured by the sensing units 2320 and 2420 (FIGS. 23 and 24) may be additional references for transmitting the first content.

Voice information or image information may also be additional references for transmitting the first content together with whether or not the first motion is recognized. For example, when voice information such as "Good morning" is recognized and the first motion is recognized by the wearable device 10, the first content may be transmitted to the external device 20 or 40.

Figure 5:
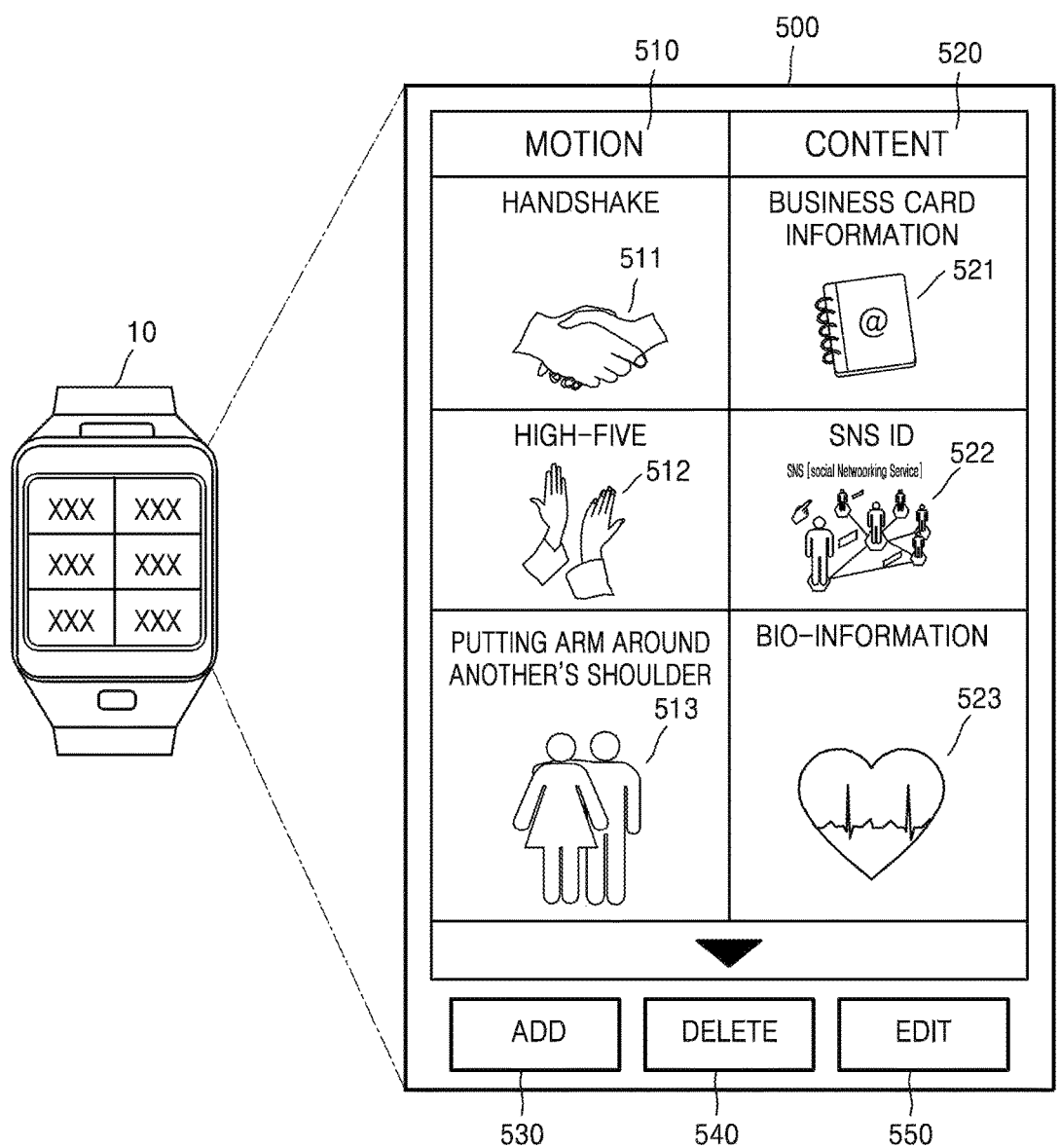
FIG. 5 is a diagram illustrating an example in which a wearable device maps each of at least one motion to predetermined content.

FIG. 5 is a diagram illustrating an example in which the wearable device 10 maps each of at least one motion 510 to predetermined content 520.

The wearable device 10 may map each of the at least one motion 510 to predetermined content 520. For example, the user may set a mapping relationship between the at least one motion 510 and the at least one piece of content 520 (referred to as "mapping relationship" below) through a predetermined user interface screen 500 in the wearable device 10. Here, the setting may include at least one of addition, deletion, and editing. Also, the user interface screen 500 may include predetermined buttons 530, 540, and 550 for setting a mapping relationship.

Referring to FIG. 5, an example of a mapping relationship set in the wearable device 10 is shown. The wearable device 10 may, for example, map a handshake motion 511, a high-five motion 512, and a motion 513 of putting an arm around another's shoulder to business card information 521, a social networking service (SNS) identifier (ID) 522, and bio-information 523, respectively. For example, the high-five motion 510 may be mapped to the SNS ID 522 so that the SNS ID 522 is transmitted to the external device 20 or 40 when the high-five motion 510 is recognized. Then, the external device 20 or 40 may add the received SNS ID 522 as a friend.

In FIG. 5, it has been described that mapping relationships between the plurality of motions 510 and the plurality of pieces of content 520 are on a one-to-one basis, but the mapping relationships between the plurality of motions 510 and the plurality of pieces of content 520 may also be set on a one-to-many, many-to-one, or many-to-many basis. For example, when any one motion is recognized, a plurality of pieces of content may be transmitted. Regardless of the type of a recognized motion, mapping relationships may be set so that the same content is transmitted upon recognition of any motion.

Also, the wearable device 10 may map each of the at least one motion 510 to predetermined content based on predetermined information received from the outside, such as the host device 30 and an external server. For example, when the user maps the at least one motion 510 to the predetermined content 520 in the host device 30, the wearable device 10 may receive information on mapping relationships from the host device 30 to synchronize mapping relationships with the host device 30.

Figure 6:
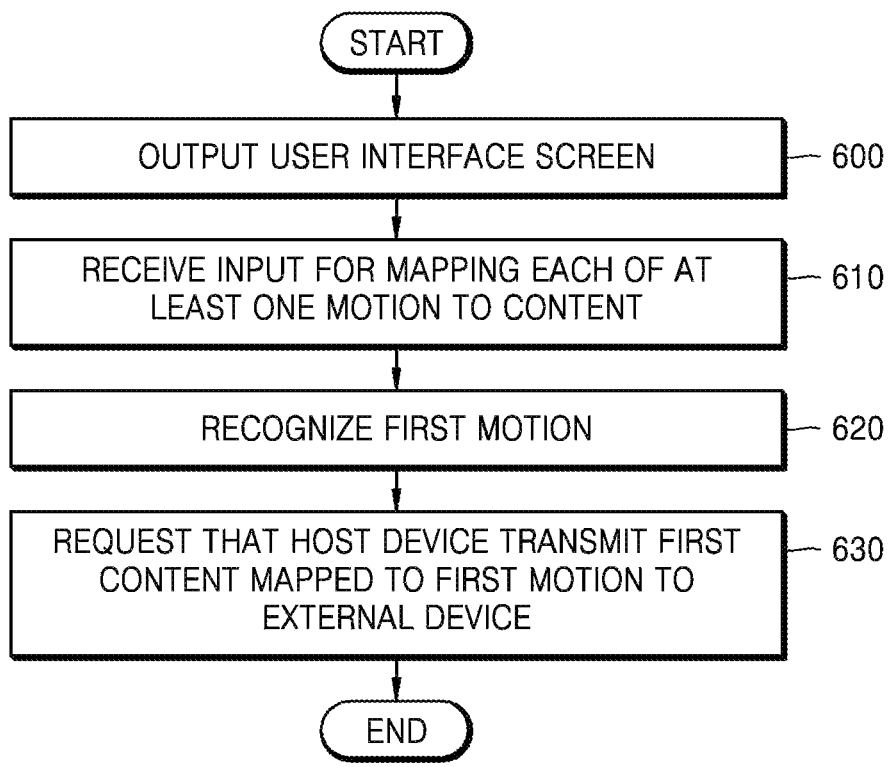
FIG. 6 is a flowchart illustrating an example in which a wearable device maps each of at least one motion to predetermined content.

FIG. 6 is a flowchart illustrating an example in which the wearable device 10 maps each of at least one motion to predetermined content.

The example illustrated in FIG. 6 includes operations shown and described above with reference to FIG. 5 and processed in order of time by the wearable device 10. Therefore, although omitted below, the above description of an operation of the wearable device 10 shown in FIG. 5 may also be applied to the example illustrated in FIG. 6. Also, operation 620 and operation 630 may correspond to operation 200 and operation 210 of FIG. 2. Therefore, the same description as that of FIG. 2 will be omitted.

In operation 600, the wearable device 10 outputs the user interface screen 500. In operation 610, the wearable device 10 may receive an input for mapping each of the at least one motion 510 to the predetermined content 520.

In operation 620, the wearable device 10 recognizes a first motion. In operation 630, the wearable device 10 may request the host device 30 to transmit first content mapped to the first motion to the external device 20 or 40 based on a mapping relationship set in operation 610.

As operation 610 has been described prior to operation 620 in order of time in FIG. 6, the wearable device 10 may receive an input for mapping the first motion to the first content in operation 610 before recognizing the first motion.

An operation for the wearable device 10 to map the first motion to the first content after recognizing the first motion will be described in detail below with reference to FIGS. 9 to 11.

Figure 7:
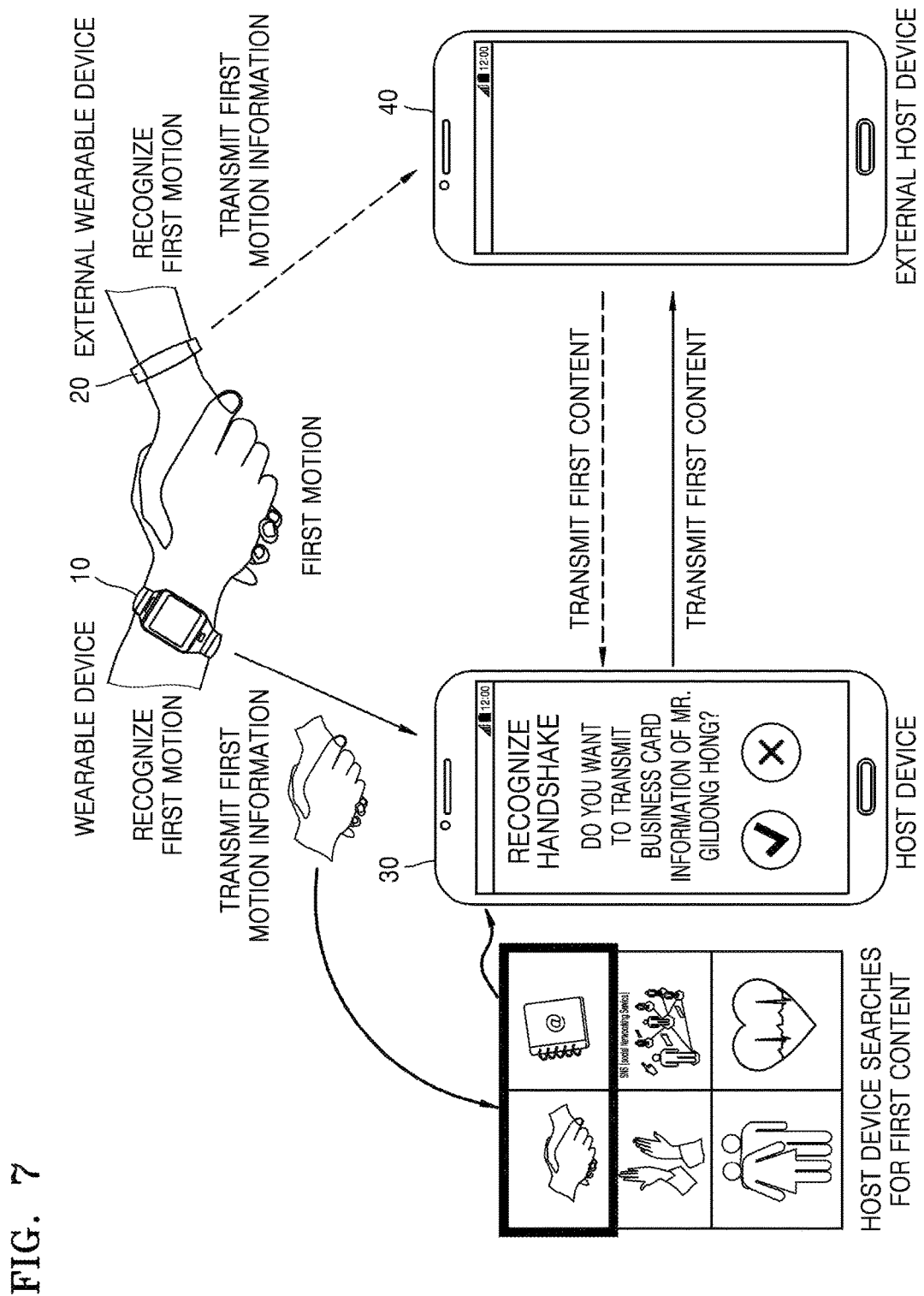
FIG. 7 is a diagram illustrating an example in which the wearable device requests that the host device transmit content to the external device according to operation 320 of FIG. 3.

FIG. 7 is a diagram illustrating an example in which the wearable device 10 requests that the host device 30 transmit content to the external device 20 or 40 according to operation 320 of FIG. 3.

As described above, when the first motion is recognized, the wearable device 10 may transmit detailed information on the first motion itself to the host device 30. The wearable device 10 may transmit information about what kind of motion corresponds to the first motion and information indicating that the first motion has been recognized to the host device 30.

The host device 30 may receive the information on the first motion from the wearable device 10 and search for the first content mapped to the first motion. For example, the user may set a mapping relationship between a motion and content in the host device 30. Then, the host device 30 may search for the first content mapped to the first motion based on the set mapping relationship.

Before the host device 30 transmits the first content to the external device 20 or 40, transmission of the first content may be confirmed by the user. For example, before transmitting the first content, the host device 30 may output a pop-up window that asks for consent to the transmission of the first content on the screen. In this way, the user may avoid a danger that content may be unintentionally transmitted to the external device 20 or 40.

In addition, when the wearable device 10 recognizes the first motion, the host device 30 may receive the first content of the external device 20 or 40 mapped to the first motion from the external device 20 or 40. For example, when the wearable device 10 recognizes the first motion and transmits information on the first motion to the host device 30, the host device 30 may be put in a state in which it is possible to receive the first content of the external device 20 or 40 mapped to the first motion from the external device 20 or 40. Also, when the external wearable device 20 recognizes the first motion, the external wearable device 20 may request the external host device 40 to transmit the first content to the host device 30. Then, the host device 30 may receive the first content of the external host device 40 mapped to the first motion from the external host device 40.

Figure 8:
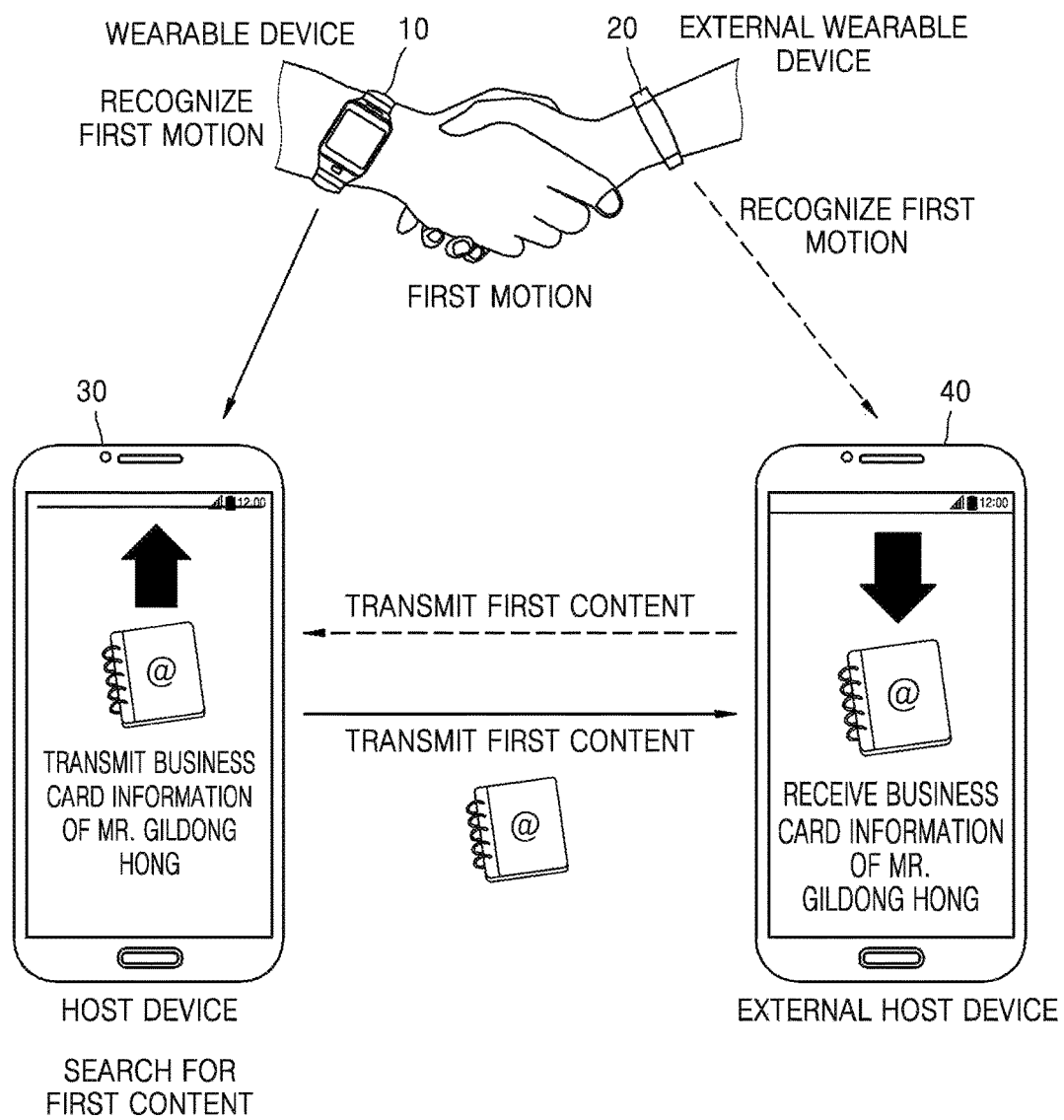
FIG. 8 is a diagram illustrating an example in which the host device transmits content to the external device according to operation 330 of FIG. 3.

FIG. 8 is a diagram illustrating an example in which the host device 30 transmits content to the external device 20 or 40 according to operation 330 of FIG. 3.

The host device 30 may transmit the first content to the external device 20 or 40 at the request of the wearable device 10. Also, the host device 30 may output a screen indicating that the first content is being transmitted to the external device 20 or 40. The external device 20 or 40 may also output a screen indicating that the first content is received.

For example, it is assumed that the first motion is a handshake motion and the first content is business card information of the user "Gildong Hong" of the wearable device 10 and the host device 30. Then, as the wearable device 10 recognizes a handshake motion, the host device 30 may transmit the business card information of Gildong Hong to the external host device 40. Also, the host device 30 may output the text "Transmit business card information of Mr. Gildong Hong" and an image on the screen. In addition to them, the host device 30 may output time information and location information corresponding to the time at which the first content is transmitted on the screen. The external host device 40 may also output the text "Receive business card information of Mr. Gildong Hong" and an image on the screen.

The host device 30 may receive first content of the external device 20 or 40 mapped to the first motion from the external device 20 or 40 at a request of the wearable device 10. For example, as the wearable device 10 recognizes a handshake motion, the host device 30 may receive business card information of the user of the external device 20 or 40 from the external device 20 or 40.

Figure 9:
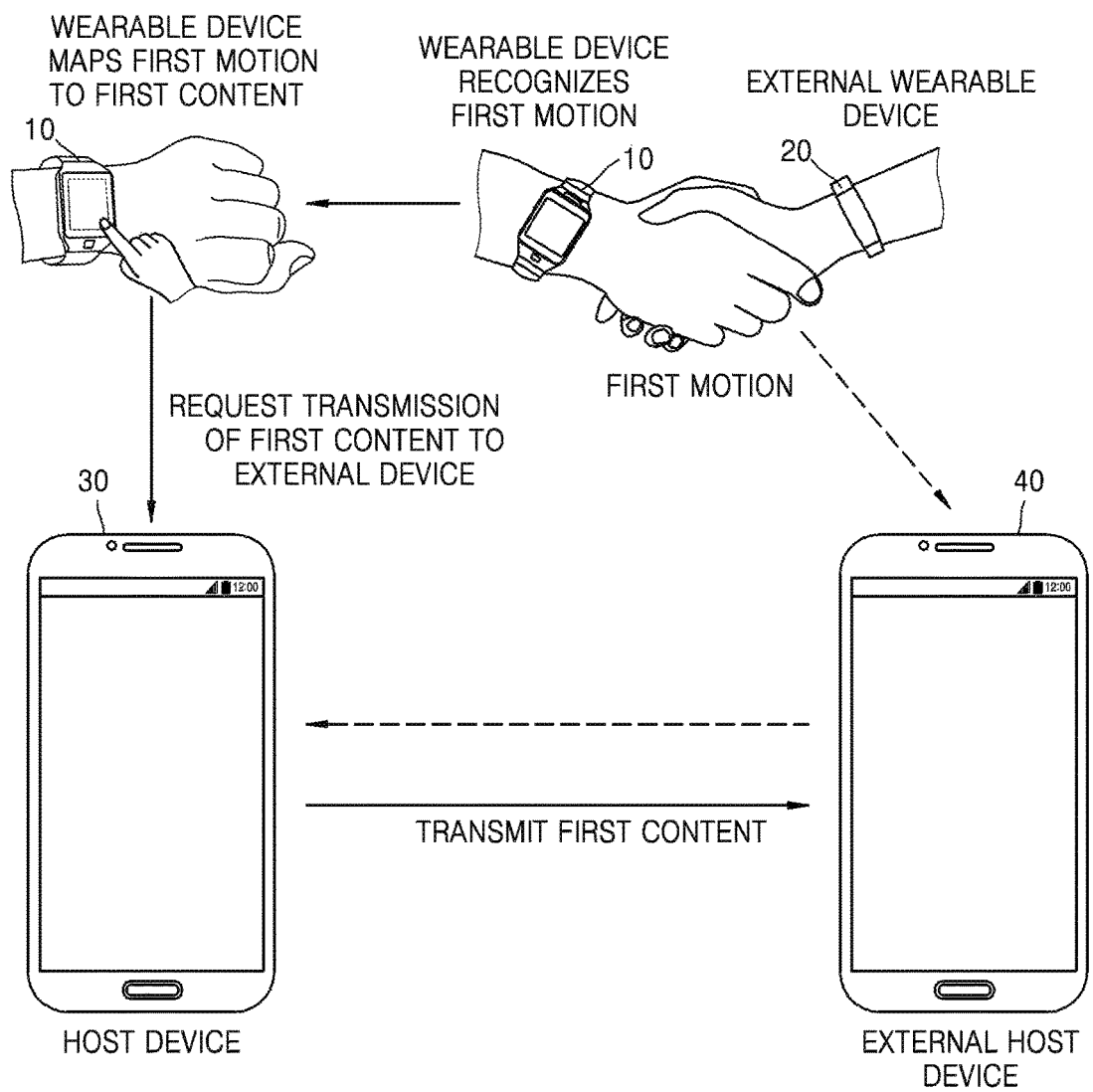
FIG. 9 is a concept diagram illustrating another example in which a wearable device requests that a host device transmit content to an external device.

FIG. 9 is a concept diagram illustrating another example in which 10 wearable device 10 requests that the host device 30 transmit content to the external device 20 or 40.

A wearable device 10, a host device 30, an external wearable device 20, and an external host device 40 of FIG. 9 may correspond to the wearable device 10, the host device 30, the external wearable device 20, and the external host device 40 of FIG. 1. Therefore, the same description as that of FIG. 1 will be omitted.

Comparing FIG. 9 with FIG. 1, the wearable device 10 of FIG. 1 maps the first motion to the first content before recognizing the first motion, whereas the wearable device 10 of FIG. 9 maps the first motion to the first content after recognizing the first motion. For example, the user of the wearable device 10 may perform the first motion and then select the first content to be transmitted to the external device 20 or 40 in the wearable device 10.

When the first motion has been registered as a motion that may be recognized by the wearable device 10 but has not been mapped to any content in advance, the wearable device 10 may recognize the first motion and then receive an input for mapping the first motion to the first content.

Therefore, the user may intentionally perform a first motion that has not been mapped to any content in advance and select different content to be transmitted to the external device 20 or 40 every time performing the first motion.

Figure 10:
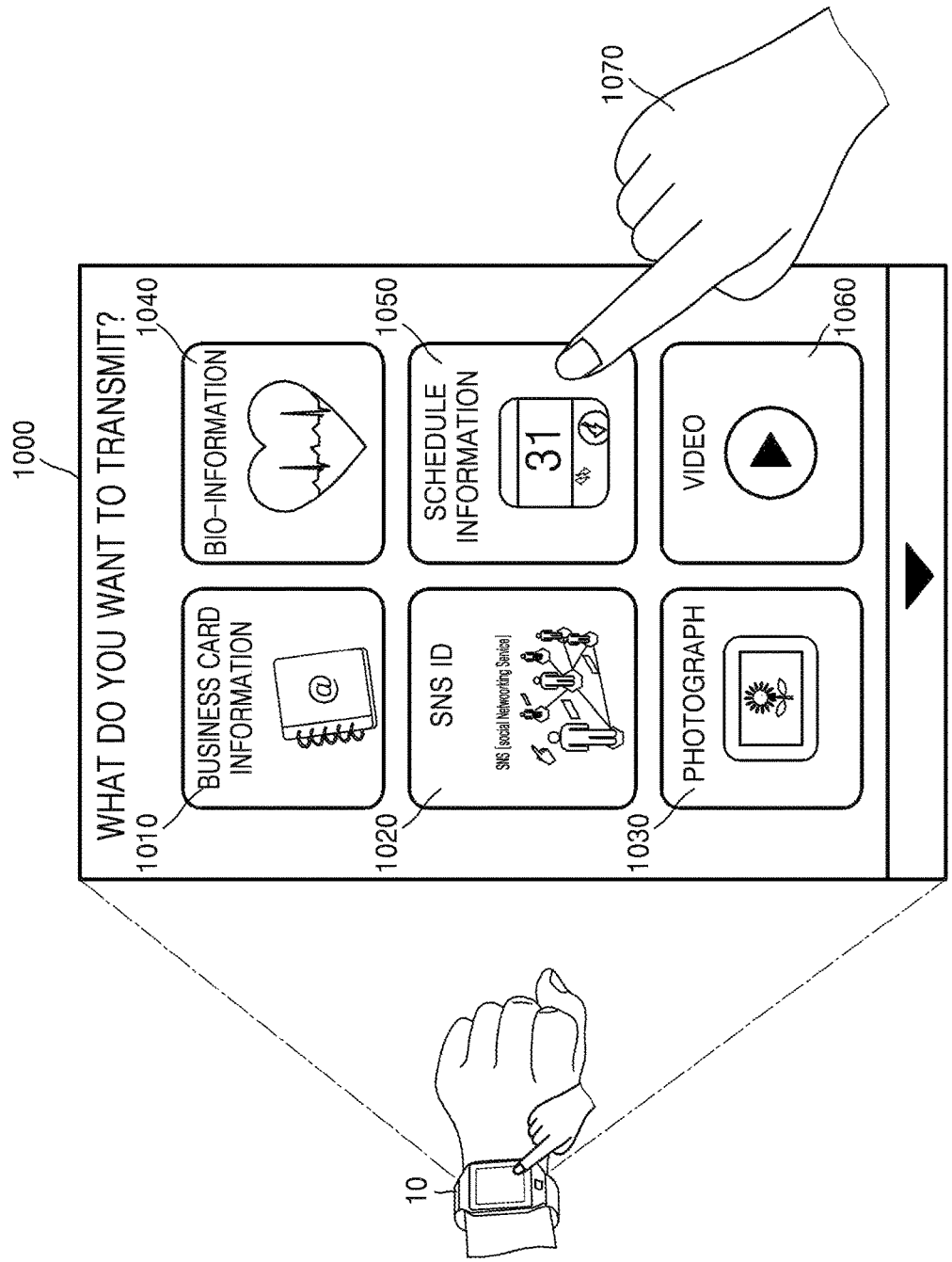
FIG. 10 is a concept diagram illustrating an example in which a wearable device maps a first motion to first content.

FIG. 10 is a concept diagram illustrating an example in which the wearable device 10 maps a first motion to first content.

For example, the wearable device 10 may recognize a first motion and then output a user interface screen 1000 for mapping the first motion to first content. The user interface screen 1000 may, for example, be output in the form of a pop-up window. The user interface screen 1000 may include pieces of content 1010 to 1060 that may be transmitted to an external device.

The wearable device 10 may receive an input 1070 for mapping the first motion to the first content through the user interface screen 1000. For example, the first content may be schedule information 1050.

FIG. 11 is a flowchart illustrating another example in which the wearable device 10 requests that the host device 30 transmit content to the external device 20 or 40.

The example illustrated in FIG. 11 includes operations shown and described above with reference to FIG. 9 and processed in order of time by the wearable device 10. Therefore, although omitted below, the above description of an operation of the wearable device 10 shown in FIG. 9 may also be applied to the example illustrated in FIG. 11. Also, operation 1100 and operation 1130 may correspond to operation 200 and operation 210 of FIG. 2. Therefore, the same description as that of FIG. 2 will be omitted.

In operation 1100, the wearable device 10 recognizes a first motion. For example, the wearable device 10 may recognize a handshake motion. Also, the handshake motion has not been mapped to any content.

In operation 1110, the wearable device 10 may output the user interface screen 1000. In operation 1120, the wearable device 10 may receive an input 1070 for mapping the first motion to first content through the user interface screen 1000.

In operation 1130, the wearable device 10 may request the host device 30 to transmit the first content mapped to the first motion to the external device 20 or 40 based on the input 1070 received in operation 1120.

However, all or some of motions other than the first motion may have been mapped to predetermined content in advance before the corresponding motions are recognized.

Figure 12A:
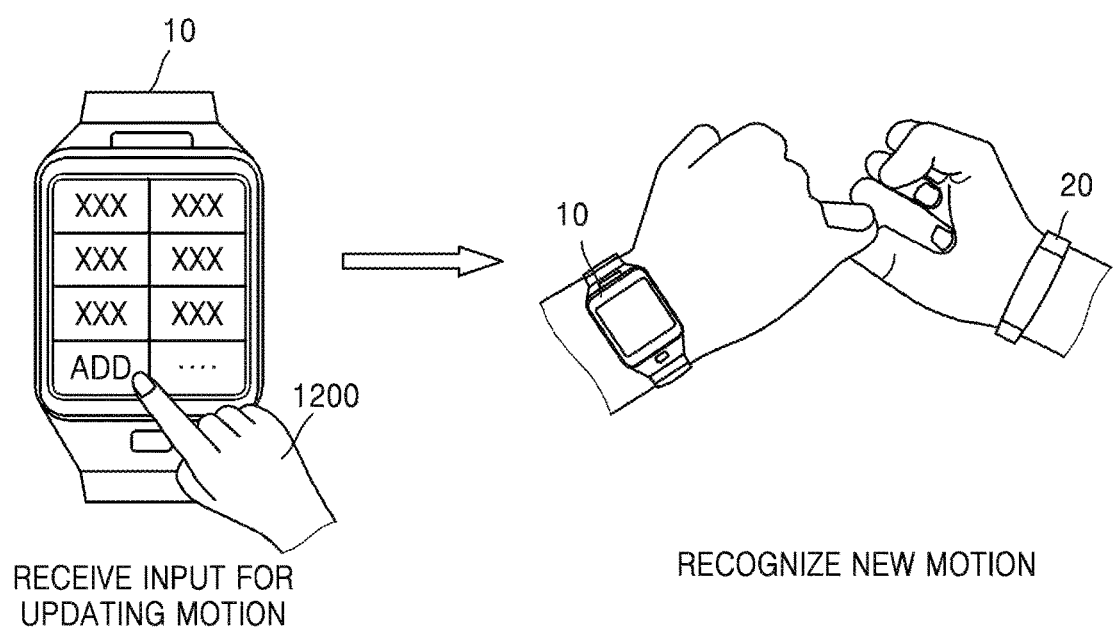
FIGS. 12A and 12B are concept diagrams illustrating an example in which a wearable device adds or edits a motion.
Figure 12B:
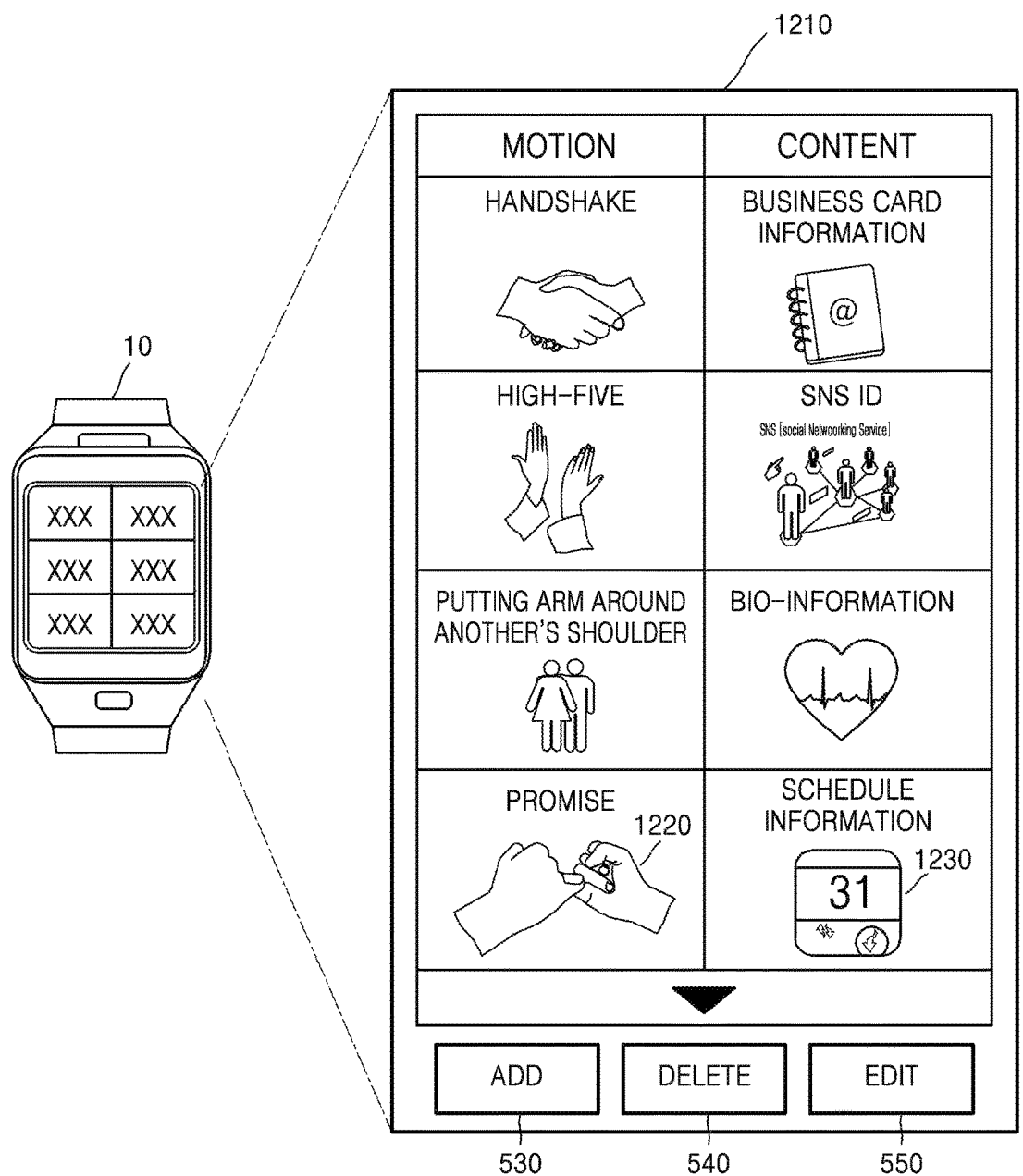

FIGS. 12A and 12B are concept diagrams illustrating an example in which a wearable device adds and edits a motion.

Here, addition of a motion means registration of a motion that has not been registered with the wearable device 10, and editing of the motion 1010 means modification of a motion that has already been registered with the wearable device 10. Addition and editing of a motion include the same technical spirit. Therefore, an operation for the wearable device 10 to add a motion will be described below with reference to FIGS. 12A to 13.

Referring to FIG. 12A, the wearable device 10 receives an input 1200 or adding a motion. Then, the wearable device 10 may recognize a motion. For example, the user may perform an adding motion.

For example, the user may perform a pinky swear motion that has not been registered with the wearable device 10. The wearable device 10 may recognize the pinky swear motion based on a slope, etc. measured by the acceleration sensor 2422 or the gyro sensor 2425.

Referring to FIG. 12B, the wearable device 10 may add an unregistered new motion based on the motion recognized by the sensing units 2320 and 2420. Also, the wearable device 10 may receive an input for setting a name for the new motion or an input for mapping the new motion to predetermined content.

For example, when a new motion is recognized, the wearable device 10 may output a user interface screen 1210 for mapping the new motion to content. Also, the user may set a name for the new motion as promise 1220, and map the promise motion 1220 to schedule information 1230.

Figure 13:
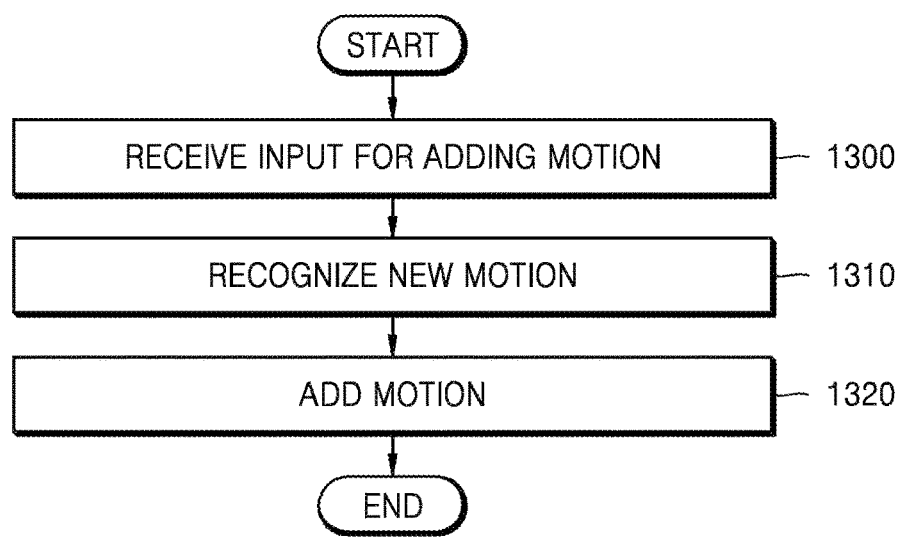
FIG. 13 is a flowchart illustrating an example in which a wearable device adds or edits at least one motion.

FIG. 13 is a flowchart illustrating an example in which a wearable device adds or edits at least one motion.

The example illustrated in FIG. 13 includes operations shown and described above with reference to FIG. 1 and processed in order of time by the wearable device 10. Therefore, although omitted below, the above description of an operation of the wearable device 10 shown in FIGS. 12A and 12B may also be applied to the example illustrated in FIG. 13.

In operation 1300, the wearable device 10 may receive an input 1200 for updating a motion. Through a physical button on the wearable device 10, a button in a user interface screen, etc., the wearable device 10 may receive the input 1200 for updating a motion.

In operation 1310, the wearable device 10 may recognize a new motion that has not been registered. The wearable device 10 may recognize a new motion within a recognizable range of the sensing units 2320 and 2340.

In operation 1320, the wearable device 10 may add a motion that may be recognized by the wearable device 10 based on the new motion recognized in operation 1310.

Figure 14:
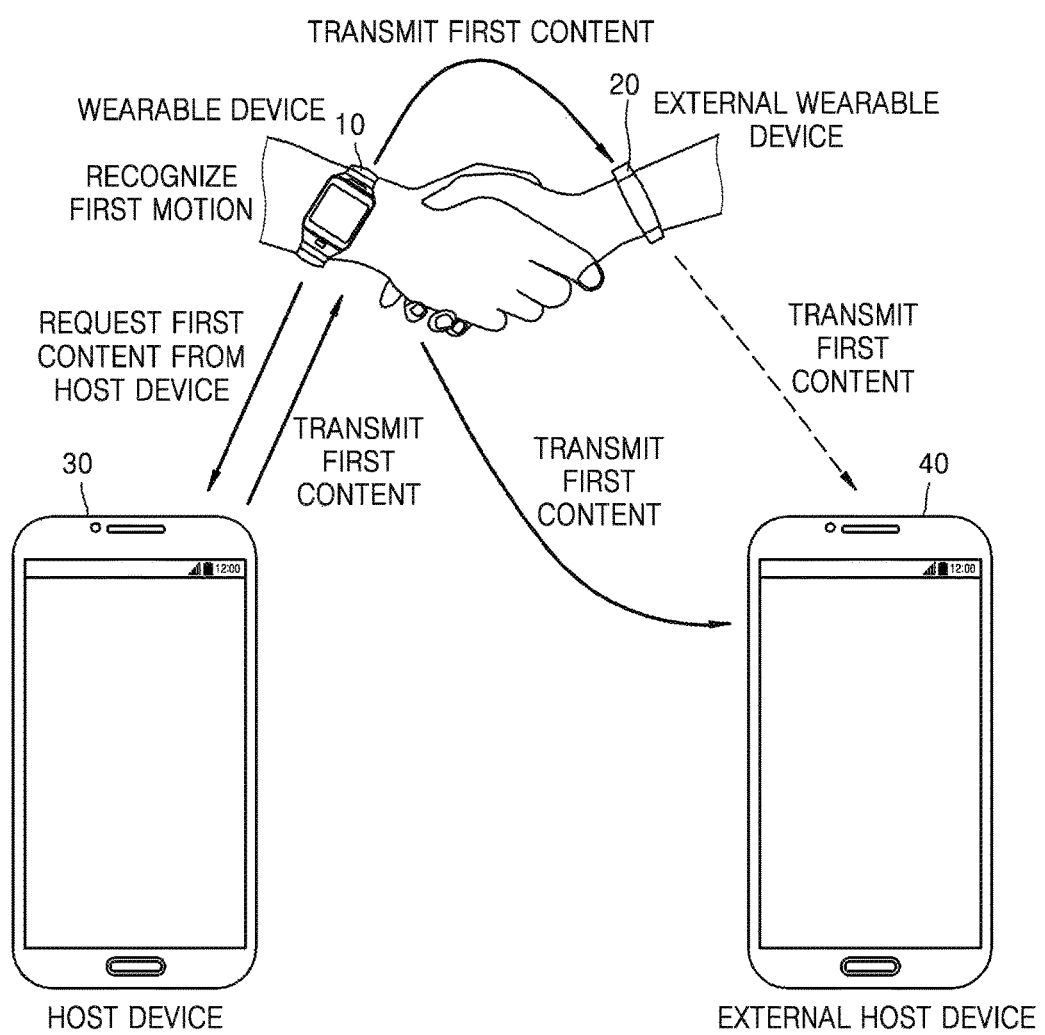
FIG. 14 is a concept diagram illustrating an example in which a wearable device transmits content to an external device.

FIG. 14 is a concept diagram illustrating an example in which a wearable device transmits content to an external device.

A wearable device 10, a host device 30, an external wearable device 20, and an external host device 40 of FIG. 14 correspond to the wearable device 10, the host device 30, the external wearable device 20, and the external host device 40 of FIG. 1. Therefore, the same description as that of FIG. 1 will be omitted.

Comparing FIG. 14 with FIG. 1, the wearable device 10 of FIG. 1 indirectly transmits first content to the external host device 40 through the host device 30, whereas the wearable device 10 of FIG. 14 may directly transmit first content to the external host device 40.

When a first motion is recognized, the wearable device 10 may request first content mapped to the first motion from the host device 30. For example, the wearable device 10 may receive the first content from the host device 30. Then, the wearable device 10 may directly transmit the first content received from the host device 30 to the external device 20 or 40. For example, the wearable device 10 may recognize a handshake motion, receive business card information transmitted from the host device 30, and transmit the received business card information to the external host device 40. In another example, the wearable device 10 may recognize a handshake motion, receive business card information transmitted from the host device 30, and transmit the received business card information to the external wearable device 20. Then, the external wearable device 20 may transmit the first content received from the wearable device 10 to the external host device 40.

For example, it is assumed that the wearable device 10 may communicate with the external device 20 or 40 and is located adjacent to the external device 20 or 40. In this case, the method in which the wearable device 10 directly transmits first content to the external device 20 or 40 as shown in FIG. 14 may be more efficient than the method in which the wearable device 10 indirectly transmits first content to the external device 20 or 40 through the host device 30 as shown in FIG. 1.

Figure 15:
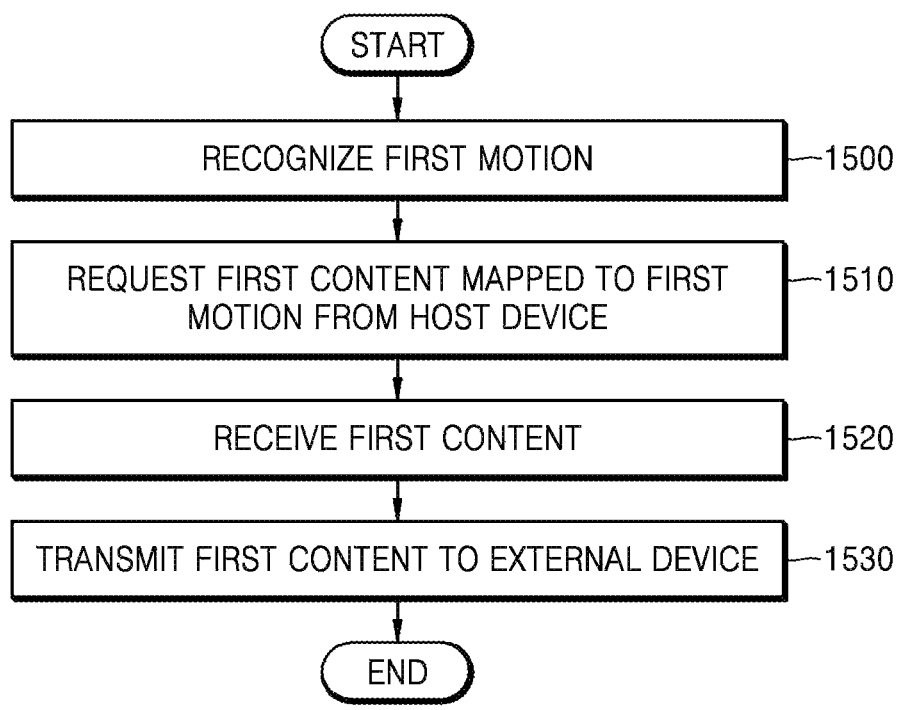
FIG. 15 is a flowchart illustrating an example in which a wearable device transmits content to an external device.

FIG. 15 is a flowchart illustrating an example in which the wearable device 10 transmits content to the external device 20 or 40.

The example illustrated in FIG. 15 includes operations shown and described above with reference to FIG. 14 and processed in order of time by the wearable device 10. Therefore, although omitted below, the above description of an operation of the wearable device 10 shown in FIG. 14 may also be applied to the example illustrated in FIG. 15.

In operation 1500, the wearable device 10 recognizes a first motion.

In operation 1510, the wearable device 10 may request first content mapped to the first motion from the host device 30. When the first motion is recognized, the wearable device 10 may transmit information of the recognized first motion itself to the host device 30. Then, the host device 30 may search for the first content mapped to the first motion and transmit the searched first content to the wearable device 10.

Alternatively, when the first motion is recognized, the wearable device 10 may transmit information on the first content mapped to the first motion to the host device 30.

Then, the host device 30 may transmit the first content to the wearable device 10 based on the received information on the first content.

In operation 1520, the wearable device 10 may receive the first content. In operation 1530, the wearable device 10 may transmit the first content received in operation 1520 to the external device 20 or 40.

Figure 16:
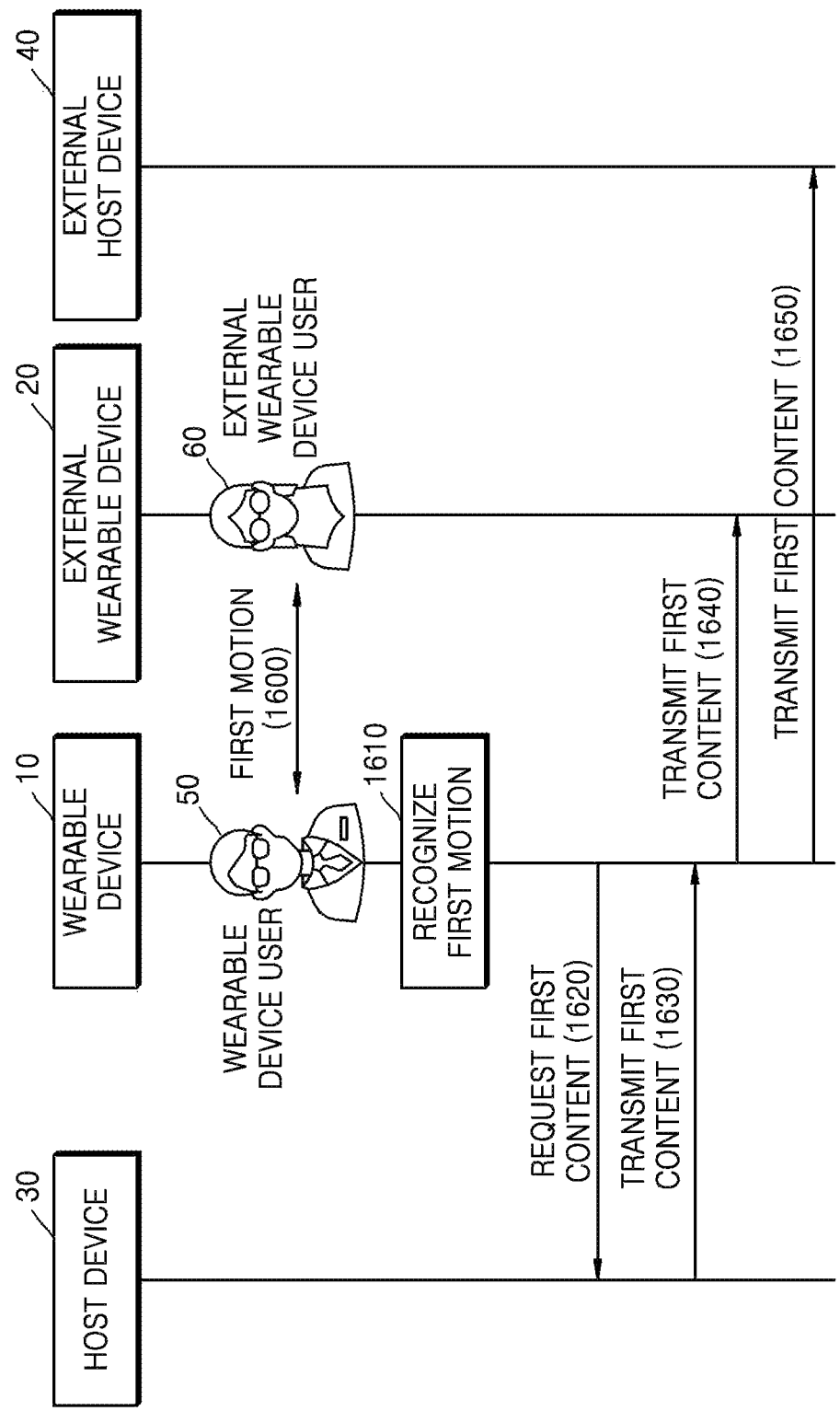
FIG. 16 is a flowchart illustrating an example in which a wearable device requests content from a host device and transmits the content received from the host device to an external device.

FIG. 16 is a flowchart illustrating an example in which the wearable device 10 requests content from the host device 30 and transmits the content received from the host device 30 to the external device 20 or 40.

The example illustrated in FIG. 16 includes operations shown and described above with reference to FIG. 14 and processed in order of time by the wearable device 10, the host device 30, the external wearable device 20, and the external host device 40. Therefore, although omitted below, the above description of an operation of the wearable device 10, the host device 30, the external wearable device 20, and the external host device 40 shown in FIG. 14 may also be applied to the example illustrated in FIG. 16.

In operation 1600, the user 50 of the wearable device 10 may interact with the user 60 of the external wearable device 20 to perform a first motion. Then, in operation 1610, the wearable device 10 may recognize the first motion.

In operation 1620, the wearable device 10 may request first content from the host device 30. Then, in operation 1630, the host device 30 transmits the first content to the wearable device 10.

In operation 1640, the wearable device 10 may transmit the first content received in operation 1630 to the external wearable device 20. In operation 1650, the wearable device 10 may transmit the first content received in operation 1630 to the external host device 40. Only one of operation 1640 and operation 1650 may be selectively performed, or the two operations may be performed simultaneously or sequentially.

The wearable device 10 may communicate with the external device 20 or 40 using a wired or wireless communication method. For example, the wearable device 10 may transmit the first content to the external device 20 or 40 through a data cable connected to the external device 20 or 40. Also, the wearable device 10 may transmit the first content to the external device 20 or 40 using a wireless communication method such as NFC, ZIGBEE, Bluetooth, or UWB communication, etc.

Also, the wearable device 10 may communicate with the external device 20 or 40 through an external server. For example, the wearable device 10 may transmit the first content to the external device 20 or 40 through a server by using a 3G or 4G communication network or a Wi-Fi network.

A method for the wearable device 10 to communicate with the external device 20 or 40 is not limited thereto. For example, the wearable device 10 may communicate with the external device 20 or 40 using ultrasonic waves, infrared rays, or a BAN, etc.

Figure 17:
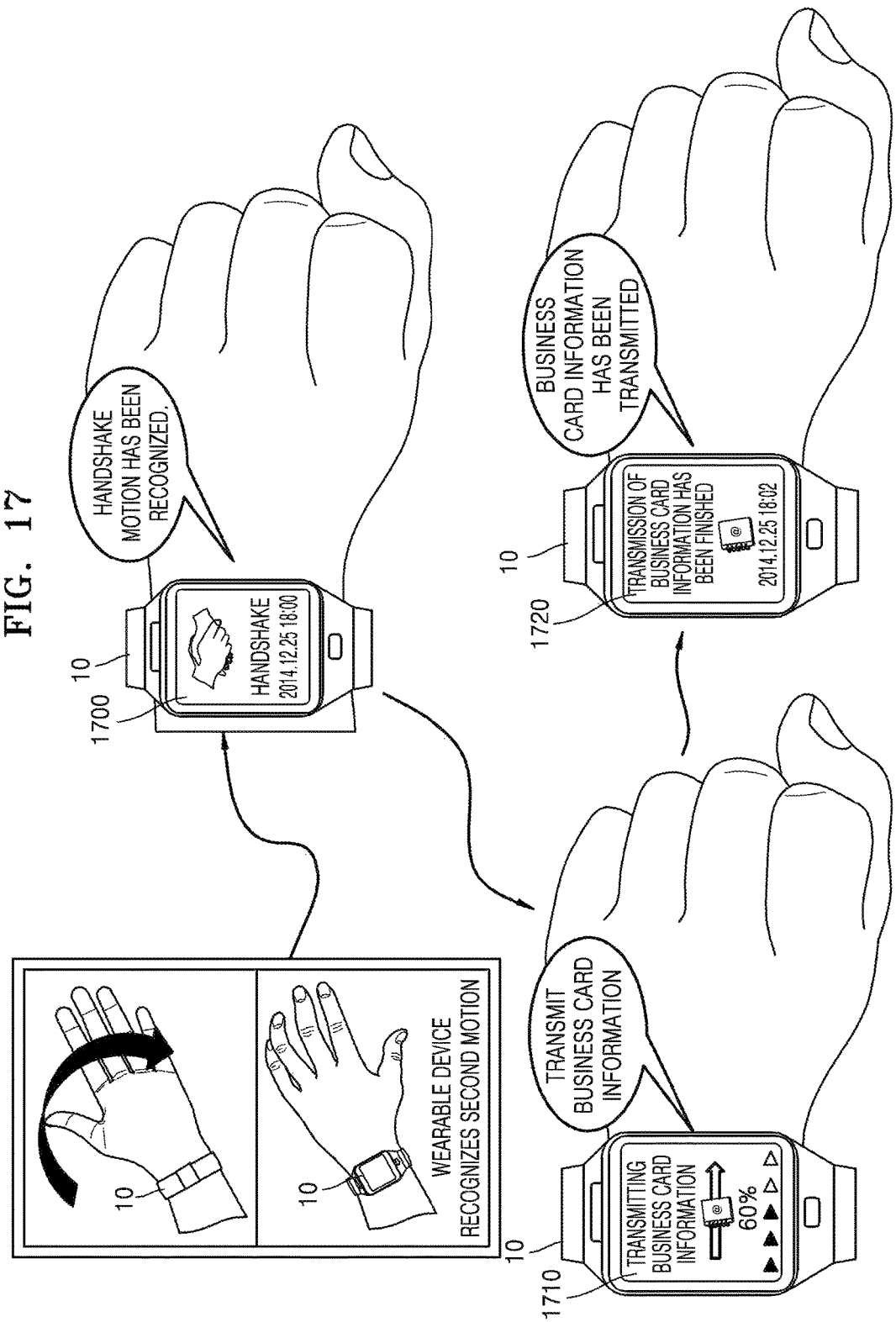
FIG. 17 is a concept diagram illustrating an example in which a wearable device outputs a transmission state of content on the screen.

FIG. 17 is a concept diagram illustrating an example in which the wearable device 10 outputs a transmission state of content on the screen.

The wearable device 10 may recognize a second motion. Here, the second motion is a motion for outputting a transmission state of first content, and distinguished from a first motion for transmitting the first content.

For example, when the wearable device 10 is a smart watch, the second motion may generally correspond to a movement for looking at the watch. As shown in FIG. 17, the second motion may be a movement of the user rotating the wearable device 10 by 90 degrees or more. However, a second motion is not limited to this, and may be freely added and edited by the operation described with reference to FIGS. 12A to 13 and so on.

When the second motion is recognized, the wearable device 10 may output the transmission state of the first content through a user interface screen. Here, the transmission state of the first content may include whether or not the first motion is recognized, a transmission process of the first content, whether or not the first content has been transmitted, and so on.

For example, referring to FIG. 17, a screen 1700 of the wearable device 10 on which whether or not the first motion is recognized is output is displayed. For example, if the first motion is a handshake motion, when the second motion is recognized, the wearable device 10 may output at least one of a text and an image of the handshake motion to notify the user that the first motion has been recognized.

The wearable device 10 may output time information or location information corresponding to the time at which the first motion has been recognized on the screen. For example, when the first motion which is a handshake motion has been recognized at 18:00 on Dec. 25, 2014, the wearable device 10 may output the corresponding time information on the screen.

The wearable device 10 may output a voice signal that provides a notification of whether or not the first motion is recognized. For example, if the first motion is a handshake motion, when the second motion is recognized, the wearable device 10 may output the voice signal "A handshake motion has been recognized."

In another example, referring to FIG. 17, a screen 1710 of the wearable device 10 on which a transmission process of the first content is output is shown. A transmission process of the first content means how much amount of the first content has been transmitted to an external device. For example, the wearable device 10 may output a transmission process progress of the first content in percentage terms on the screen.

The wearable device 10 may output at least one of a text and an image of the first content to notify the user of the first content that is being transmitted. For example, when the first content is business card information, the wearable device 10 may output a text and an image of the business card on the screen together with a transmission process of the business card information.

The wearable device 10 may output a voice signal that provides a notification of a transmission process of the content. For example, if the first content is business card information, the wearable device 10 may output the voice signal "Business card information is transmitted" upon starting transmission of the content.

Meanwhile, the wearable device 10 may cancel or stop the transmission of the first content. For example, through a predetermined hard key on the wearable device 10, a predetermined button in a user interface screen, etc., the wearable device 10 may cancel or stop the transmission of the first content. In another example, the wearable device 10 may recognize a predetermined option for canceling or stopping the transmission of the first content. The predetermined motion for canceling or stopping the transmission may be freely added or edited by the operation described with reference to FIGS. 12A to 13.

In still another example, referring to FIG. 17, a screen 1720 of the wearable device 10 on which whether or not the first content has been transmitted is shown. Here, whether or not the first content has been transmitted means the failure or success of transmission and reception, and is distinguished from a transmission process of the first content.

The wearable device 10 may receive information about whether or not the first content has been transmitted from the external device 20 or 40 or the host device 30 and output whether or not the first content has been transmitted on the screen. For example, when the first content is business card information and the business card information has been successfully transmitted, the wearable device 10 may output at least one of a text and an image providing a notification that the business card information has been successfully transmitted.

The wearable device 10 may output time information or location information corresponding to the time at which the transmission of the first motion has succeeded or failed on the screen. For example, when the first content has been successfully transmitted at 18:02 on Dec. 25, 2014, the wearable device 10 may output the corresponding time information on the screen.

The wearable device 10 may output a voice signal that provides a notification of whether or not the first content has been transmitted. For example, when the first content is business card information and the business card information has been successfully transmitted, the wearable device 10 may output the voice signal "Business card information has been transmitted."

Figure 18:
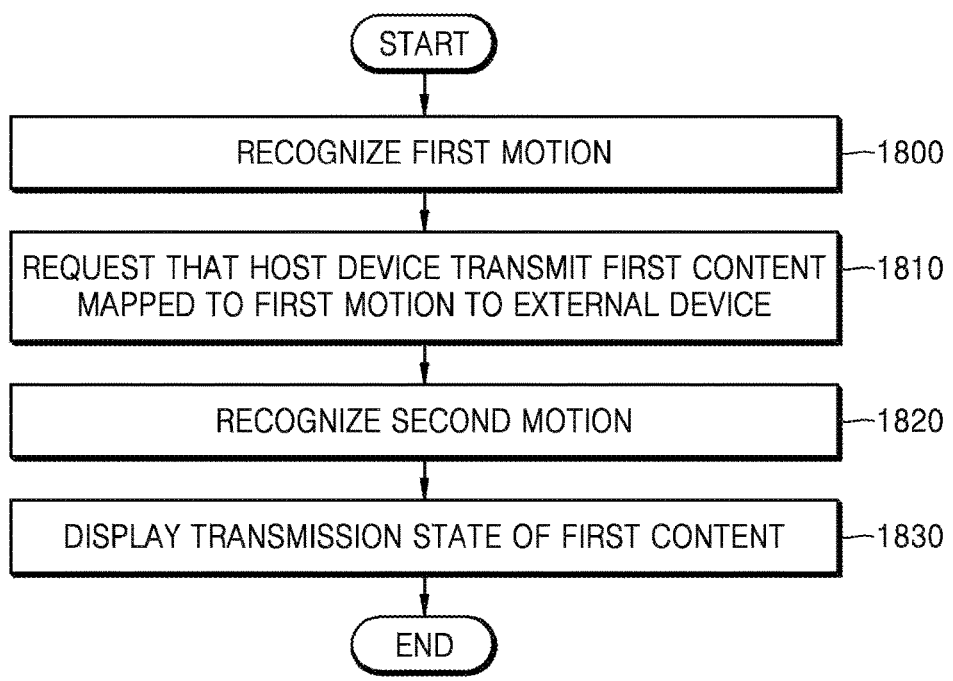
FIG. 18 is a flowchart illustrating an example in which a wearable device outputs a transmission state of content on the screen.

FIG. 18 is a flowchart illustrating an example in which a wearable device outputs a transmission state of content on the screen.

The example illustrated in FIG. 18 includes operations shown and described above with reference to FIG. 17 and processed in order of time by the wearable device 10. Therefore, although omitted below, the above description of an operation of the wearable device 10 shown in FIG. 17 may also be applied to the example illustrated in FIG. 18. Also, operation 1800 and operation 1810 may correspond to operation 200 and operation 210 of FIG. 2. Therefore, the same description as that of FIG. 2 will be omitted.

In operation 1800, the wearable device 10 recognizes a first motion. In operation 1810, the wearable device 10 requests that the host device 30 transmit first content mapped to the first motion to the external device 20 or 40.

In operation 1820, the wearable device 10 recognizes a second motion. The second motion is, for example, a motion for outputting a transmission state of the first content on the screen, and distinguished from the first motion.

In operation 1830, when the second motion has been recognized, the wearable device 10 outputs a transmission state of the first content on the screen. A transmission state of the first content output on the screen of the wearable device 10 may be changed over time. For example, when the second motion is recognized, the wearable device 10 may output whether or not the first motion is recognized on the screen for the first time. After that, the wearable device 10 may output a transmission process of the first content on the screen, and output whether or not the first content has been transmitted on the screen as the transmission of the first content is finished.

Figure 19:
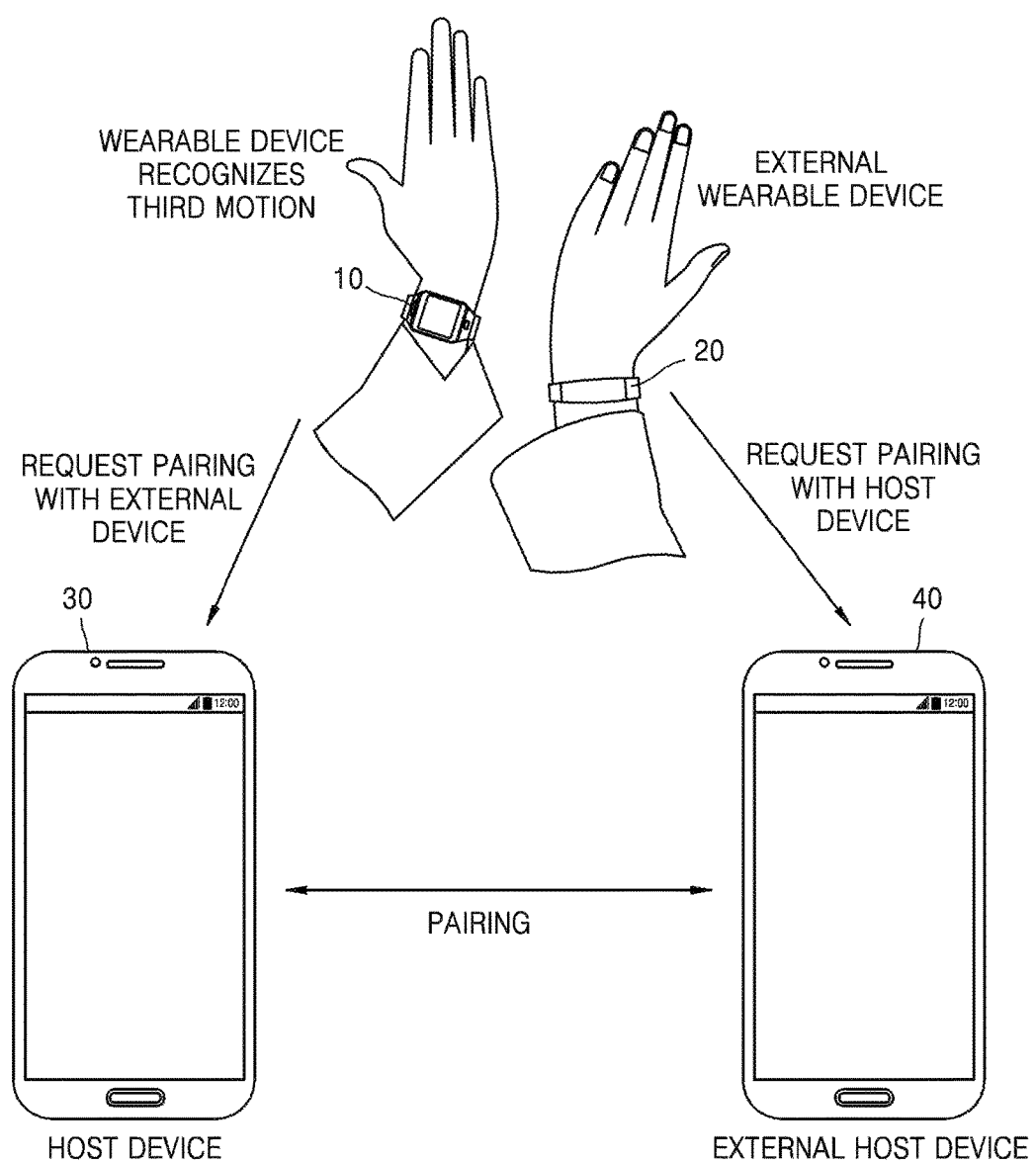
FIG. 19 is a concept diagram illustrating an example in which a wearable device requests that a host device pair with an external device.

FIG. 19 is a concept diagram illustrating an example in which a wearable device requests that host device pair with an external device.

The wearable device 10 may recognize a third motion. Here, the third motion is a motion for pairing with the external device 20 or 40, and is distinguished from a first motion for transmitting first content and a second motion for outputting a transmission state of the first content on the screen.

For example, when the wearable device 10 is a smart watch, the third motion may be a high-five motion. However, a third motion is not limited to this, and may be freely added and edited by the operation described with reference to FIGS. 12A to 13 and so on.

When the third motion is recognized, the wearable device 10 may request that the host device 30 pair with the external device 20 or 40. Likewise, when the third motion is recognized, the external wearable device 20 may request that the external host device 40 pair with the host device 30. For example, when the wearable device 10 recognizes the third motion, the host device 30 may pair with the external device 20 or 40. Here, pairing may include the host device 30 initiating communication with the external device 20 or 40 so as to transmit or receive data. The wearable device 10 may go through an authentication and registration process so as to pair with the host device 30.

However, if the host device 30 has already been paired with the external device 20 or 40 before requested by the wearable device 10, the host device 30 may directly transmit first content to the external device 20 or 40 without a repeated pairing process.

Figure 20:
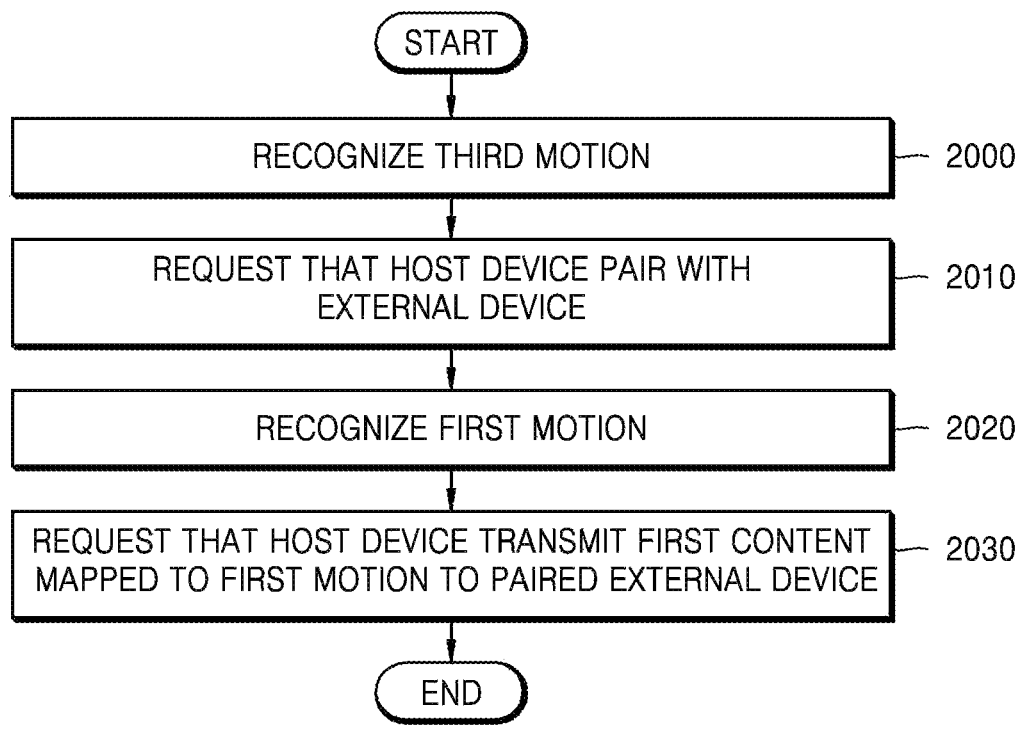
FIG. 20 is a flowchart illustrating an example in which a wearable device requests that a host device pair with an external device.

FIG. 20 is a flowchart illustrating an example in which a wearable device requests that a host device pair with an external device.

The example illustrated in FIG. 20 includes operations shown and described above with reference to FIG. 19 and processed in order of time by the wearable device 10. Therefore, although omitted below, the above description of an operation of the wearable device 10 shown in FIG. 19 may also be applied to the example illustrated in FIG. 20. Also, operation 2020 and operation 2030 may correspond to operation 200 and operation 210 of FIG. 2. Therefore, the same description as that of FIG. 2 will be omitted.

In operation 2000, the wearable device 10 may recognize a third motion. Here, the third motion may, for example, be a motion for pairing with the external device 20 or 40, and may be distinguished from a first motion for transmitting first content and a second motion for outputting a transmission state of the first content on the screen.

In operation 2010, the wearable device 10 may request that the host device 30 pair with the external device 20 or 40. Then, the host device 30 pairs with the external device 20 or 40, so that communication between the host device 30 and the external device 20 or 40 may be initiated.

In operation 2020, the wearable device 10 recognizes the first motion. In operation 2030, the wearable device 10 requests that the host device 30 transmit the first content mapped to the first motion to the paired external device 20 or 40.

Meanwhile, the host device 30 may be selectively configured to pair with the external device 20 or 40 in advance in order to transmit the first content.

Figure 21:
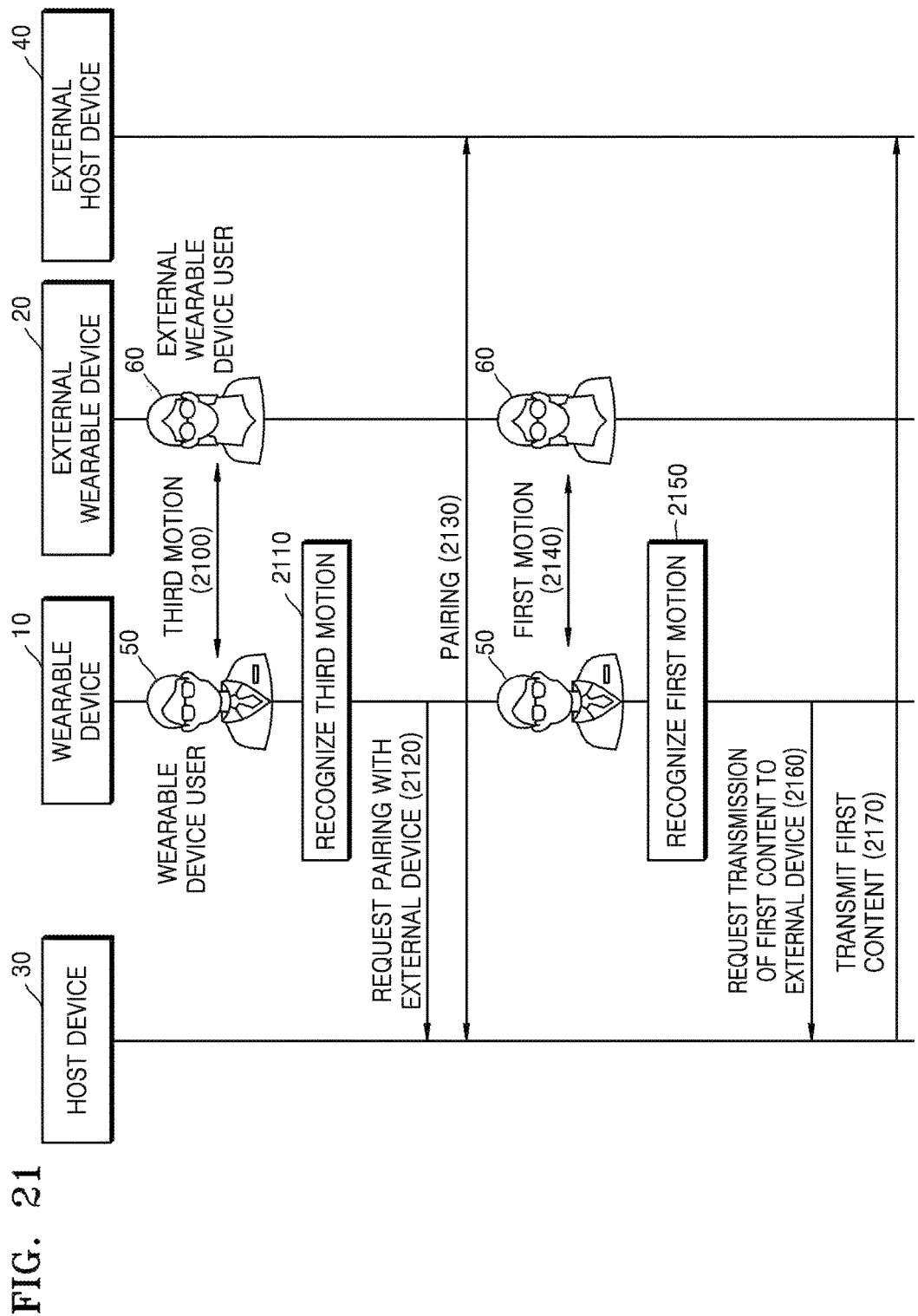
FIG. 21 is a flowchart illustrating an example in which a wearable device requests that a host device pair with an external device and the host device pairs with the external device.

FIG. 21 is a flowchart illustrating an example in which the wearable device 10 requests that the host device 30 pair with the external device 20 or 40 and the host device 30 pairs with the external device 20 or 40.

The example illustrated in FIG. 21 includes operations shown and described above with reference to FIG. 20 and processed in order of time by the wearable device 10, the host device 30, the external wearable device 20, and the external host device 40. Therefore, although omitted below, the above description of an operation of the wearable device 10, the host device 30, the external wearable device 20, and the external host device 40 shown in FIG. 20 may also be applied to the example illustrated in FIG. 21.

Also, operation 2140 to operation 2170 may correspond to operation 300 to operation 330, respectively. Therefore, the same description as that of FIG. 3 will be omitted.

In operation 2100, the user 50 of the wearable device 10 may perform a third motion with the user 60 of the external wearable device 20. For example, the third motion may be a high-five motion.

In operation 2110, the wearable device 10 recognizes the third motion.

In operation 2120, the wearable device 10 may request that the host device 30 pair with the external device 20 or 40. For example, it is assumed that the host device 30 and the external device 20 or 40 communicate based, for example, on a Bluetooth communication method. Then, the wearable device 10 may request the host device 30 to transmit a Bluetooth broadcasting message including pairing information to the external device 20 or 40. The pairing information may be included in the Bluetooth broadcasting message together with the identification information of the host device 30 and transmitted to the external device 20 or 40. Then, the external device 20 or 40 may identify the wearable device 10 based on the identification information included in the Bluetooth broadcasting message and determine whether or not to perform pairing.

In operation 2130, the host device 30 may be paired with the external host device 40. Alternatively, the host device 30 may also be paired with the external wearable device 20.

In operation 2140, the wearable device 10 performs a first motion. In operation 2150, the wearable device 10 recognizes the first motion.

In operation 2160, the wearable device 10 requests that the host device 30 transmit first content to the paired external device 20 or 40.

In operation 2170, the host device 30 transmits the first content to the paired external wearable device 20. Alternatively, the host device 30 may also transmit the first content to the external host device 40.

Figure 22:
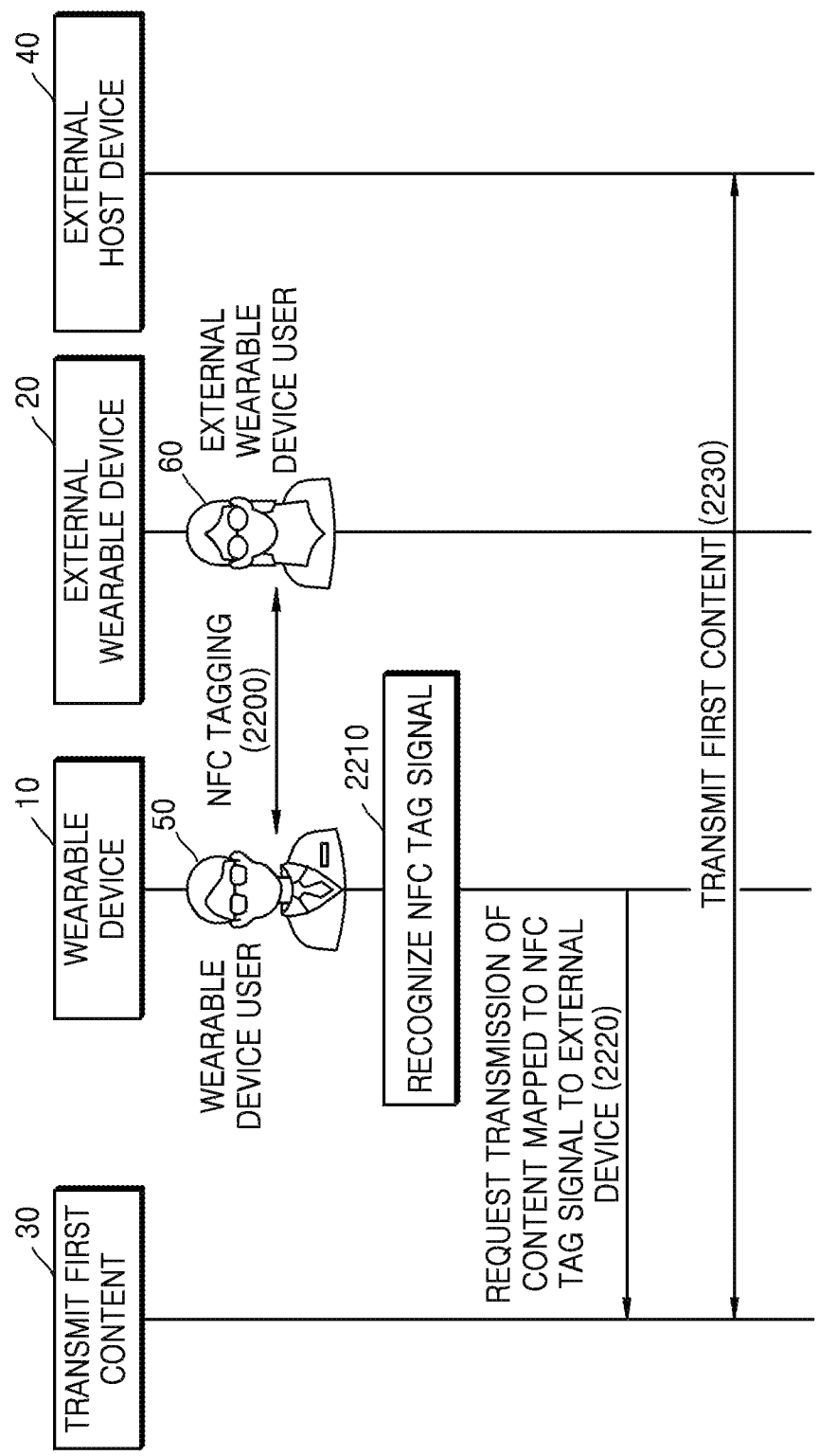
FIG. 22 is a flowchart illustrating another example in which a wearable device requests that a host device transmit content to an external device and the host device transmits the content to the external device.

FIG. 22 is a flowchart illustrating another example in which a wearable device requests that a host device transmit content to an external device and the host device transmits the content to the external device.

The example illustrated in FIG. 22 includes operations shown and described above with reference to FIG. 1 and processed in order of time by the wearable device 10, the host device 30, the external wearable device 20, and the external host device 40. Therefore, although omitted below, the above description of an operation of the wearable device 10, the host device 30, the external wearable device 20, and the external host device 40 shown in FIG. 1 may also be applied to the example illustrated in FIG. 22.

The wearable device 10 may transmit first content to the external device 20 or 40 based, for example, on at least one signal among an NFC tag signal, an ultrasonic signal, an infrared signal, and a BAN signal received from the external device 20 or 40 in addition to a motion.

For example, in operation 2200, the user 50 of the wearable device 10 may perform NFC tagging with the user 60 of the external wearable device 20. Then, in operation 2210, the wearable device 10 may recognize an NFC tag signal transmitted from the external device 20 or 40.

In operation 2220, the wearable device 10 may request that the host device 30 transmit content mapped to the NFC tag signal to the external device 20 or 40. Then, in operation 2230, the host device 30 may transmit the content mapped to the NFC tag signal to the external host device 40.

Also, the wearable device 10 may set whether or not at least one signal among an NFC tag signal, an ultrasonic signal, an infrared signal, and a BAN signal has been recognized as a reference for transmitting the first content together with whether or not a first motion is recognized. For example, when the first motion is recognized and a predetermined NFC tag signal is recognized, the wearable device 10 may request the host device 30 to transmit the first content to the external device 20 or 40.

An NFC tag signal, an ultrasonic signal, an infrared signal, and a BAN signal may be freely added and edited by the operation described with reference to FIGS. 12A to 13.

The methods described above may be written as a program executable in a computer, and may be implemented by a digital computer that runs the program by using a computer-readable recording medium. The structure of data used in the methods described above may be recorded in computer-readable recording media in several ways. The computer-readable recording media include storage media, such as magnetic storage media (e.g., a read-only memory (ROM), a random access memory (RAM), a universal serial bus (USB) memory, a floppy disk, a hard disk, etc.) and optical reading media (e.g., a compact disc (CD)-ROM, a digital versatile disc (DVD), etc.).

Figure 23:
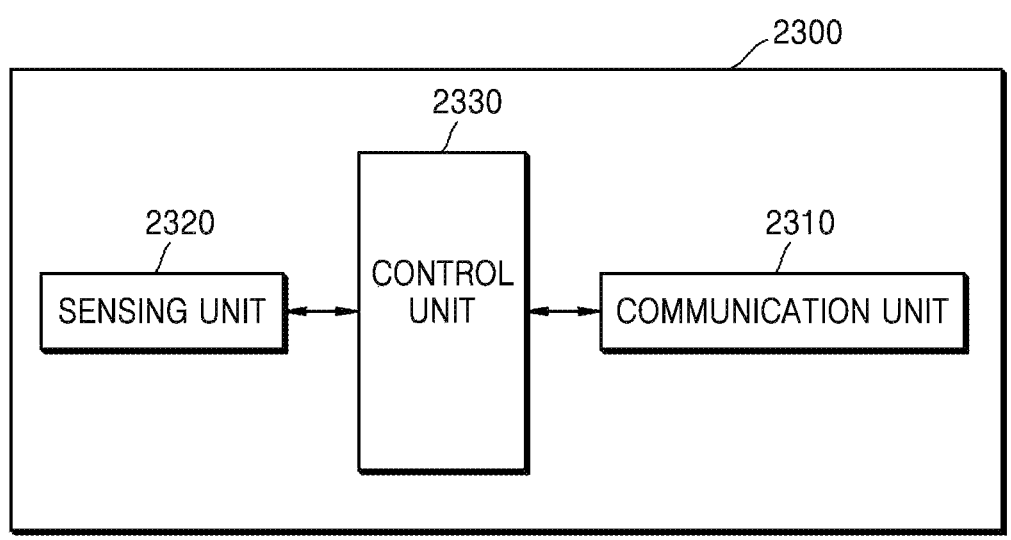
FIGS. 23 and 24 are configuration diagrams illustrating an example of a wearable device.
Figure 24:
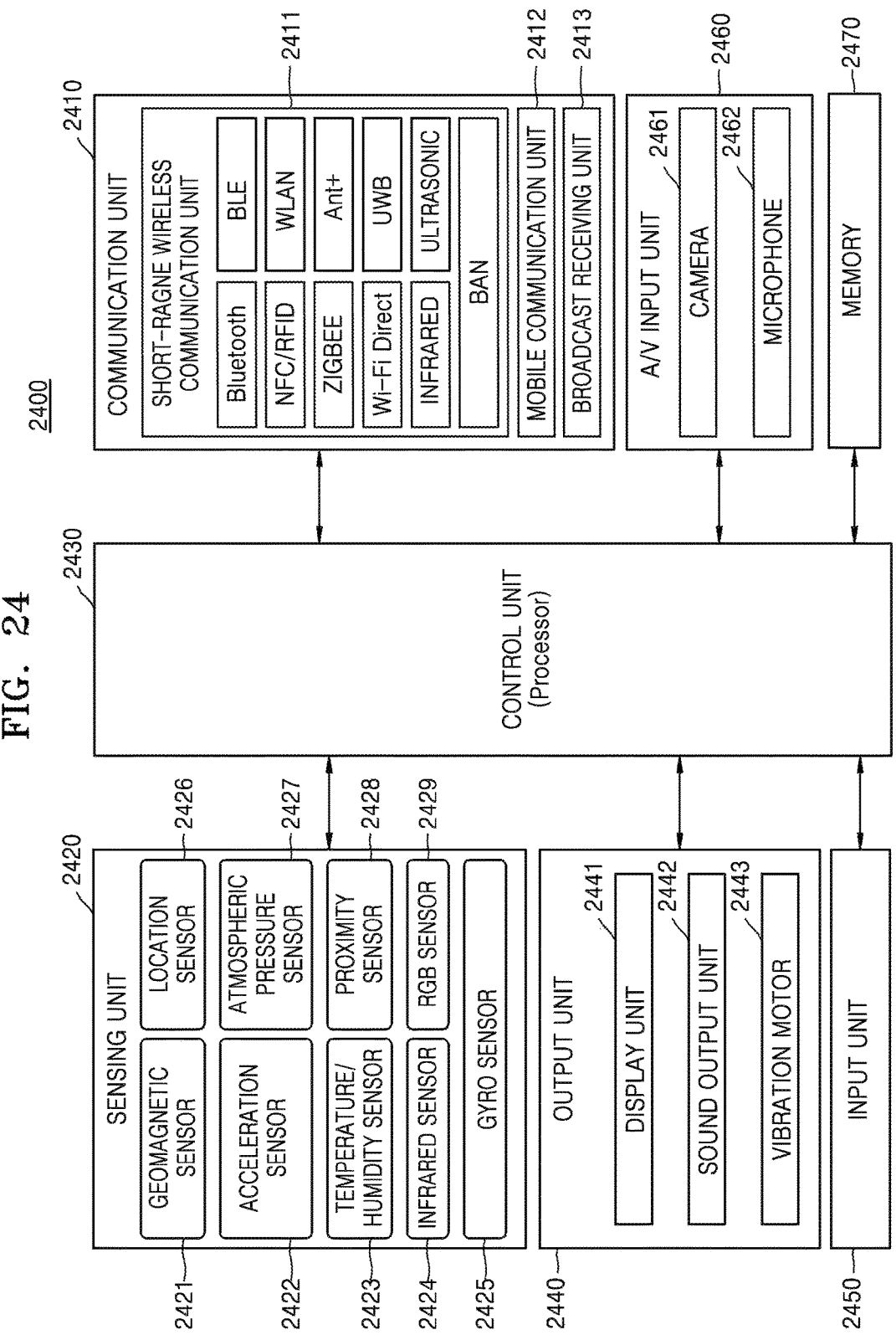

FIGS. 23 and 24 are configuration diagrams illustrating an example of a wearable device.

A device 2300 shown in FIGS. 23 and 24 may correspond to the wearable device 10 described above with reference to FIGS. 1 to 22.

Referring to FIG. 23, the wearable device 2300 may include a communication unit 2310 including communication circuitry, the sensing unit 2320 including at least one sensor, and a control unit 2330 including, for example, a controller.

All the components shown in FIG. 23 are not essential components of the wearable device 10. The wearable device 10 may be implemented by a larger or smaller number of components than those shown in FIG. 23.

For example, referring to FIG. 24, a wearable device 2400 may further include an output unit 2440, an input unit 2450, an audio/video (AN) input unit 2460, and a memory 2470.

The communication units 2310 and 2410 may include one or more components that allow data communication between the wearable device 10 and the other devices 20, 30, and 40 or between the wearable device 10 and a server. For example, the communication units 2310 and 2410 may include a short-range wireless communication unit 2411, a mobile communication unit 2412, and a broadcast receiving unit 2413.

The short-range wireless communication unit 2411 may include a Bluetooth communication unit, a Bluetooth low energy (BLE) communication unit, an NFC/radio frequency identification (RFID) unit, a wireless local area network (WLAN; Wi-Fi) communication unit, a ZigBee communication unit, an infrared data association (IrDA) communication unit, a Wi-Fi direct (WFD) communication unit, a UWB communication unit, an Ant+ communication unit, an infrared communication unit, an ultrasonic communication unit, a BAN communication unit, etc., but is not limited thereto.

The mobile communication unit 2412 exchanges wireless signals with at least one of a base station, an external terminal, and a server in a mobile communication network. Here, a wireless signal may include a voice call signal, a video call signal, or various forms of data based on transmission and reception of a text/multimedia message.

The broadcast receiving unit 2413 receives a broadcast signal and/or broadcast-associated information from the outside through a broadcast channel. The broadcast channel may include a satellite channel and a terrestrial wave channel. According to an example of implementation, the wearable device 10 may not include the broadcast receiving unit 2413.

For example, the communication units 2310 and 2410 may communicate with the host device 30. Also, the communication units 2310 and 2410 may communicate with the external device 20 or 40.

The sensing units 2320 and 2420 include various sensors that may sense states of the devices 2300 and 2400 or surroundings of the devices 2300 and 2400, and transfer sensed information to the control units 2330 and 2430.

The sensing units 2320 and 2420 may, for example, include at least one of a geomagnetic sensor 2421, an acceleration sensor 2422, a temperature/humidity sensor 2423, an infrared sensor 2424, a gyro sensor 2425, a location sensor (e.g., global positioning system (GPS)) 2426, an atmospheric pressure sensor 2427, a proximity sensor 2428, and an RGB (illuminance) sensor 2429, but are not limited thereto. Functions of the respective sensors may be intuitively inferred from their names by those of ordinary skill in the art, and thus detailed descriptions of the functions will be omitted.

For example, the sensing units 2320 and 2420 may recognize at least one motion of the wearable device 10.

The control units 2330 and 2430 are generally configured to control overall operation of the wearable device 10 and may, for example, be in the form of a configurable or programmable processor or processing circuitry. For example, the control units 2330 and 2430 may be configured to control the user input unit 2450, the output unit 2440, the sensing units 2320 and 2420, the communication units 2310 and 2410, the NV input unit 2460, etc. overall by executing programs stored in the memory 2470.

For example, the control units 2330 and 2430 may be configured to request that the host device 30 transmit first content mapped to a first motion recognized by the sensing units 2320 and 2420 to the external device 20 or 40.

The control units 2330 and 2430 may be configured to determine the distance between the wearable device 10 and the external device 20 or 40. When the determined distance is equal to or less than a predetermined distance and the sensing units 2320 and 2420 recognize the first motion, the control units 2330 and 2430 may be configured to request that the host device 30 transmit the first content to the external host device 40.

The control units 2330 and 2430 may be configured to add an unregistered new motion based on a motion recognized by the sensing units 2320 and 2420 or edit a registered motion.

When the sensing units 2320 and 2420 recognize the first motion, the control units 2330 and 2430 may be configured to request that the first content be mapped to the first motion from the host device 30.

When the sensing units 2320 and 2420 recognize a third motion, the control units 2330 and 2430 may be configured to request that the host device 30 pair with the external device 20 or 40. When the sensing units 2320 and 2420 recognize the third motion, the control units 2330 and 2430 may be configured to request that the host device 30 transmit a Bluetooth broadcasting message including pairing information to the external device 20 or 40.

The control units 2330 and 2430 may be configured to request that the host device 30 transmit predetermined content to the external device 20 or 40 based on at least one signal among an NFC tag signal, an ultrasonic signal, an infrared signal, and a BAN signal received by the communication units 2310 and 2410.

The output unit 2440 may, for example, output an audio signal, a video signal, or a vibration signal, and include a display unit 2441, a sound output unit 2442, and a vibration motor 2443.

The display unit 2441 outputs information processed by the wearable device 10. For example, the display unit 2441 may, for example, include a display for displaying a user interface for selecting a virtual image, a user interface for setting an operation of a virtual image, and a user interface for purchasing an item of a virtual image.

Meanwhile, when the display unit 2441 and a touchpad are layered and constitute a touch screen, the display unit 2441 may be used as an input device as well as an output device. The display unit 2441 may, for example, include at least one of a liquid crystal display, a thin film transistor-liquid crystal display, an organic light-emitting diode, a flexible display, a three-dimensional (3D) display, and an electrophoretic display. According to an implementation form, the wearable device 10 may two or more display units 2441. At this time, the two or more display units 2441 may be disposed to face each other by using a hinge.

The sound output unit 2442 outputs audio data received from the communication unit 2410 or stored in the memory 2470. Also, the sound output unit 2442 outputs sound signals (e.g., a call signal receiving sound, a message receiving sound, a notification sound, etc.) associated with functions performed by the wearable device 10. The sound output unit 2442 may include a speaker, a buzzer, and so on.

The vibration motor 2443 may output a vibration signal. For example, the vibration motor 2443 may output a vibration signal corresponding to an output of the audio data (e.g., the call signal receiving sound, the message receiving sound, etc.) or video data. Also, when a touch is input to the touch screen, the vibration motor 2443 may output a vibration signal.

For example, the display unit 2441 of the output unit 2440 may output a transmission state of the first content when the sensing unit 2420 recognizes a second motion.

The input unit 2450 may include a portion to which the user inputs data for controlling the wearable device 2400. For example, the input unit 2450 may be a key pad, a dome switch, a touchpad (a touch capacitive type, a pressure resistive type, an infrared sensing type, a surface acoustic wave type, an integral tension measurement type, a piezo effect type, etc.), a jog wheel, a jog switch, etc., but is not limited thereto.

For example, the input unit 2450 may receive an input for mapping each of at least one motion to content. The input unit 2450 may receive an input for mapping the first motion to the first content.

The AN input unit 2460 is provided to input an audio signal or a video signal, and may include a camera 2461, a microphone 2462, and so on. The camera 2461 may obtain an image frame such as a still image or a moving image through an image sensor in a video call mode or a photographing mode. An image captured by the image sensor may be processed by the control unit 2430 or an image processing unit (not shown).

The image frame processed by the camera 2461 may be stored in the memory 2470 or transmitted to the outside through the communication unit 2410. Two or more cameras 2461 may be provided according to a configuration of the wearable device 2400.

The microphone 2462 receives an external sound signal and processes the external sound signal as electrical voice data. For example, the microphone 2462 may receive the external sound signal from the external device 20 or 40 or a speaker. The microphone 2462 may use various noise removal algorithms for removing noise that is generated during the process of receiving the external sound signal.

The memory 2470 may store a program for processing, configuring and controlling the control unit 2430 and store data that is input to or output from the wearable device 2400.

The memory 2470 may include at least one type of storage medium among a flash memory-type storage medium, a hard disk-type storage medium, a multimedia card micro-type storage medium, a card-type memory (e.g., a secure digital (SD) memory, an extreme digital (XD) memory, etc.), a RAM, a static RAM (SRAM), a ROM, an electrically erasable programmable ROM (EEPROM), a programmable ROM (PROM), a magnetic memory, a magnetic disc, and an optical disc.

For example, the memory 2470 may store information on at least one motion that may be recognized by the sensing unit 2420.

Also, the memory 2470 may store content mapped to at least one motion and mapping relationships between motions and content.

According to the above descriptions, when the wearable device 10 recognizes a predetermined motion, predetermined content may be transmitted to the external device 20 or 40. Therefore, by performing the predetermined motion with the wearable device 10, a user may readily transmit the predetermined content to the external device 20 or 40.

It should be understood that the examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

What is claimed is:

1. A wearable device comprising:
   communication circuitry configured to communicate with a host device, wherein the host device is for hosting the wearable device and is external to the wearable device and is to be used by a user of the wearable device;
   at least one sensor configured to recognize at least one motion of a user of the wearable device, wherein the at least one motion includes a first motion comprising an act of the user of the wearable device moving the wearable device for an interaction between the user of the wearable device and a user of an external device;
   a controller configured to determine a distance between the wearable device and the external device and request the host device to transmit first content mapped to a first motion recognized by the at least one sensor to the external device when the determined distance is equal to or less than a predetermined distance and the at least one sensor recognizes the first motion,
   wherein the external device is external to and different from each of the host device and the wearable device and the user of the wearable device is different from the user of the external device,
   output circuitry configured to output a user interface screen on the wearable device after the sensor has recognized the first motion; and
   input circuitry configured to receive an input, on the user interface screen, for mapping the first motion to the first content.

2. The wearable device of claim 1, wherein the controller is configured to set a new motion other than the at least one motion based on a motion recognized by the at least one sensor or to edit the at least one motion.

3. The wearable device of claim 1, wherein, the output circuitry is configured to output a transmission state of the first content when the at least one sensor recognizes a second motion.

4. The wearable device of claim 1, wherein, the controller is configured to request that the host device pair with the external device when the at least one sensor recognizes a third motion.

5. The wearable device of claim 4, wherein, the controller is configured to request that the host device transmit a Bluetooth broadcasting message comprising information about pairing with the external device to the external device when the at least one sensor recognizes the third motion.

6. The wearable device of claim 1, wherein the communication circuitry is configured to receive at least one signal among a near field communication (NFC) tag signal, an ultrasonic signal, an infrared signal, and a body area network (BAN) signal from the external device, and
   the controller is configured to request that the host device transmit predetermined content mapped to the at least one signal received by the communication circuitry to the external device based on the at least one signal.

7. A method of transmitting content, the method comprising:
   recognizing, by a wearable device, at least one motion of a user of the wearable device, wherein the at least one motion includes a first motion comprising an act of the user of the wearable device moving the wearable device for an interaction between the user of the wearable device and a user of an external device,
   determining a distance between the wearable device and the external device; and
   requesting, by the wearable device, that a host device transmit first content mapped to the first motion to the external device when the determined distance is equal to or less than a predetermined distance and the first motion is recognized,
   wherein the host device is external to the wearable device and is used by the user of the wearable device, the external device is external to and different from each of the host device and the wearable device, and the user of the wearable device is different from the user of the external device, and
   outputting a user interface on the wearable device after the wearable device has recognized the first motion, and
   receiving an input, on the user interface screen, for mapping the first motion to the first content.

8. The method of claim 7, further comprising adding a new motion other than the at least one motion based on a motion recognized by the wearable device and/or editing the at least one motion.

9. The method of claim 7, further comprising:
   recognizing, by the wearable device, a second motion; and
   outputting a transmission state of the first content when the second motion is recognized.

10. The method of claim 7, further comprising:
    recognizing, by the wearable device, a third motion; and requesting, by the wearable device, that the host device pair with the external device when the third motion is recognized.

11. The method of claim 10, wherein requesting comprises requesting, by the wearable device, that the host device transmit a Bluetooth broadcasting message comprising information about the pairing to the external device when the third motion is recognized.

12. A non-transitory computer-readable recording medium storing program for causing a computer to perform the method of claim 7.

* * * * *